US 6,715,850 B1

(12) United States Patent
Diaz et al.

(10) Patent No.: US 6,715,850 B1
(45) Date of Patent: Apr. 6, 2004

(54) COMPUTER WITH REMOVABLE PANELS

(75) Inventors: Elizabeth B. Diaz, Woodside, CA (US); Kun-Chi Hsieh, Taipei (TW); Bo Siu-Fai, Taipei (TW)

(73) Assignees: Hewlett-Packard Development Company, L.P., Houston, TX (US); Tatung Company, Taipei (TW)

( * ) Notice: Subject to any disclaimer, the term of this patent is extended or adjusted under 35 U.S.C. 154(b) by 0 days.

(21) Appl. No.: 09/580,393

(22) Filed: May 26, 2000

(51) Int. Cl.$^7$ ................................................. H01R 9/00
(52) U.S. Cl. ................................ 312/223.2; 312/351.2; 312/263
(58) Field of Search ............................ 312/223.2, 263, 312/264, 265, 265.5, 265.6, 351.2

(56) References Cited

U.S. PATENT DOCUMENTS

| | | | |
|---|---|---|---|
| 4,949,934 A | 8/1990 | Krenz et al. | |
| 5,417,012 A | * 5/1995 | Brightman et al. | ...... 312/223.2 |
| 5,593,220 A | 1/1997 | Seid et al. | .................. 312/265 |
| 5,743,606 A | 4/1998 | Scholder | |
| 5,825,626 A | 10/1998 | Hulick et al. | ................ 361/724 |
| 5,831,822 A | 11/1998 | Hulick et al. | ................ 361/687 |
| 5,845,977 A | * 12/1998 | Neukam et al. | ......... 312/223.2 |
| 5,896,273 A | * 4/1999 | Varhese et al. | .......... 312/223.2 |
| 5,967,633 A | 10/1999 | Jung | |
| 5,978,217 A | * 11/1999 | Kerrigan et al. | ......... 312/223.2 |
| 5,997,115 A | * 12/1999 | Radloff et al. | ........... 312/223.2 |
| 6,027,191 A | 2/2000 | Korinsky et al. | |
| 6,053,586 A | 4/2000 | Cook et al. | |
| 6,301,103 B1 | * 10/2001 | Abboud | .................... 312/223.1 |
| 6,456,486 B1 | * 9/2002 | Frame et al. | ................ 248/534 |

FOREIGN PATENT DOCUMENTS

EP 0896272 A2 2/1999

* cited by examiner

Primary Examiner—Jose V. Chen
Assistant Examiner—Jerry A. Anderson

(57) ABSTRACT

A computer assembly comprising a computer housing and a plurality of separate outer casing members mountable in enveloping relationship with the housing; the plurality of outer casing members having an attached state in fixedly mounted relationship with the housing and a disengaged state in nontouching relationship with the housing; the plurality of outer casing members being toolessly switchable between the attached state and the disengaged state.

7 Claims, 40 Drawing Sheets

COMPUTER WITH REMOVABLE PANELS

RELATED APPLICATIONS

The present application is related to the following U.S. Patent Applications: U.S. patent application Ser. No. 09/552,201 filed Apr. 19, 2000 for COMPUTER WITH MODULAR COMPONENTS of Elizabeth B. Diaz, Felix Guerra and Yancy Chen; U.S. patent application Ser. No. 09/552,555 filed Apr. 19, 1999 now U.S. Pat. No. 6,307,742 for COMPUTER WITH READILY ACCESSIBLE MOTHERBOARD of Elizabeth B. Diaz, Kun-Chi Hsieh, and Bo Sui-Fai, U.S. patent application Ser. No. 09/552,193 filed Apr. 19, 2000 now U.S. Pat. No. 6,407,910 for COMPUTER WITH MODULAR DRIVE IN SEPARATE BAY of Elizabeth B. Diaz, Felix Guerra, Yancy Chen, Kun-Chi Hsieh, and Bo Siu-Fai; U.S. patent application Ser. No. 09/552,556 filed Apr. 19, 2000 now U.S. Pat. No. 6,466,433 for COMPUTER WITH MODULAR POWER SUPPLY ASSEMBLY IN SEPARATE BAY of Elizabeth B. Diaz, Felix Guerra, Yancy Chen, Kun-Chi Hsieh, and Bo Siu-Fai; and U.S. patent application Ser. No. 09/552,428 filed Apr. 19, 2000 U.S. Pat. No. 6,462,940 for COMPUTER WITH MODULAR REMOVABLE MEDIA DRIVE of Elizabeth B. Diaz, Kun-Chi Hsieh, and Bo Siu-Fai; U.S. Patent Application for COMPUTER WITH TRANSLATING DOOR of Elizabeth B. Diaz, Peter K. Lee, and Kun-Chi Hsieh Ser. No. 09/583,453; and U.S. Patent Application filed the same date as this application for TOWER COMPUTER WITH LOW CENTER OF GRAVITY of Elizabeth B. Diaz, Felix Guerra, and Yancy Chen Ser. No. 09/580,816 which are hereby incorporated by reference for all that is disclosed therein.

FIELD OF THE INVENTION

The invention relates generally to computers and, more particularly, to a computer having removable panels.

BACKGROUND OF THE INVENTION

It is generally desirable to provide a computer with an aesthetically pleasing appearance. One technique for doing this is to provide an outer plastic casing mounted over an internal sheet metal housing. However when it is desired to also provide a computer with modular or easily accessible components the casing can create difficulties with accessing the interior of the computer. One solution is to provide a computer casing with easily removable panels. Such removable panels may also be provided in different colors to change the appearance of the computer. However, the connectors and interlock mechanisms for such panels may detract from the appearance of the housing. Also, they may cause such panels may be inadvertently disconnected by the owner or removed by unauthorized individuals desiring to do mischief. One solution is to provide panels that may only be removed using special tools, but this may make it too inconvenient for the owner.

Thus, a need exists for removable panels which are aesthetically pleasing and which may be removed and replaced easily by the owner without lending themselves to inadvertent or mischievous removal.

SUMMARY OF THE INVENTION

The present invention is directed to a computer which has removable side panels and/or a removable base panel. The panels snap-lock in place and are unlocked by operation of an actuator located at the bottom of the computer.

Thus the invention may comprise a computer assembly comprising a computer housing; and a plurality of separate outer casing members mountable in enveloping relationship with the housing. The plurality of outer casing members having an attached state in fixedly mounted relationship with the housing and a disengaged state in nontouching relationship with the housing. The plurality of outer casing members are toolessly switchable between the attached state and the disengaged state.

The invention may also comprise a method of replacing a side panel member of a computer casing comprising positioning the computer with a bottom portion thereof exposed; and pushing a push button on the bottom portion.

The invention may also comprise a method of constructing a computer comprising providing a computer housing holding electronic components and capturing a computer housing within a plurality of toolessly snap-locking, toolessly unlockable casing members.

The invention may also comprise a computer assembly comprising a housing; and a detachable base member, having at least one deflectable member snappingly lockingly receivable in said housing and unlockable therefrom by finger deflection of a bottom portion of the deflectable member accessible from a bottom side of the base member.

BRIEF DESCRIPTION OF THE DRAWING

One illustrative and presently preferred embodiment of the invention is illustrated in the appended drawing of which.

DETAILED DESCRIPTION OF THE INVENTION

In General

Figure 1:
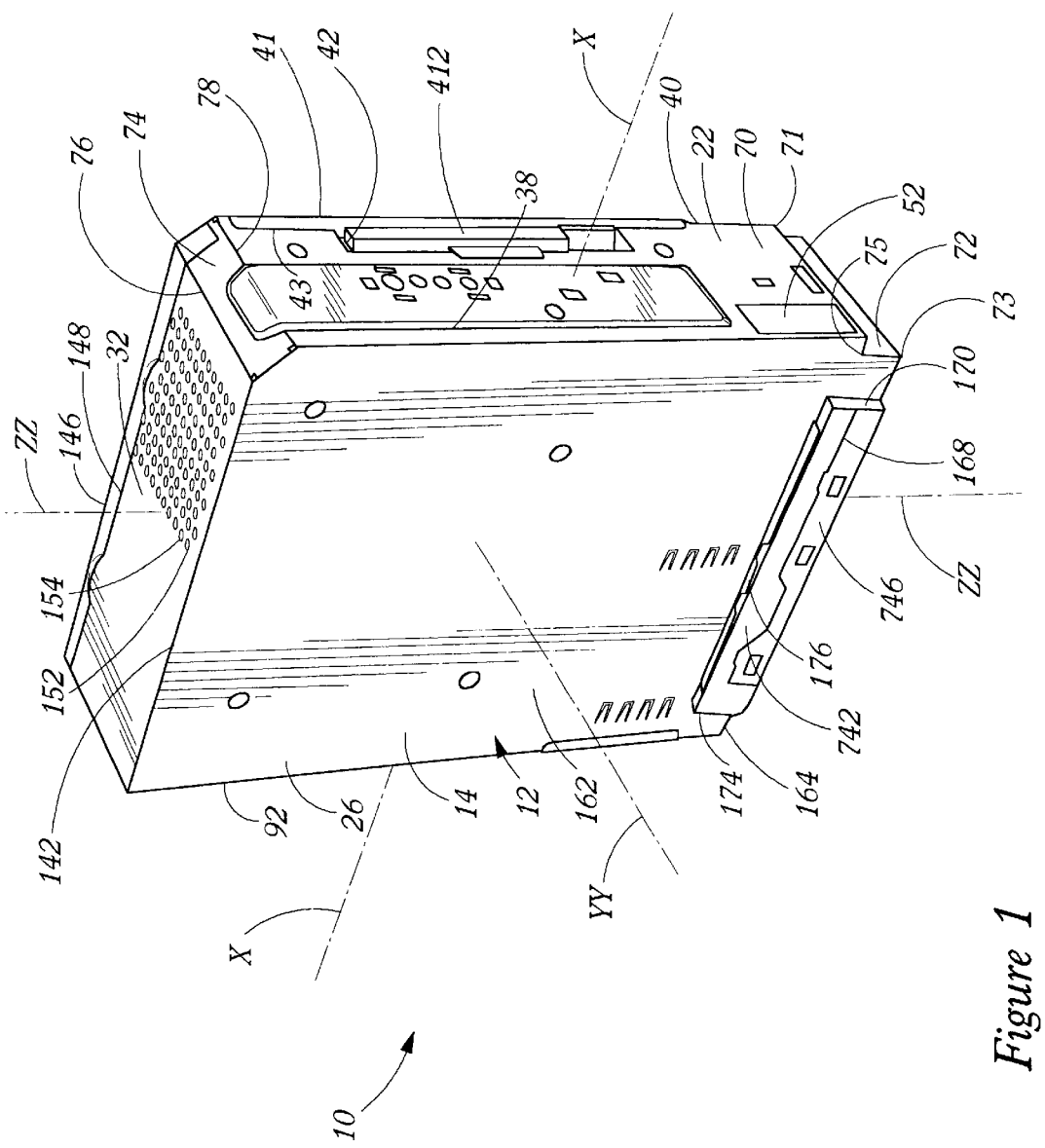
FIG. 1 is a top, front, left perspective view of a computer housing.

The drawing figures disclose, in general, a computer assembly comprising, a computer housing 12; and a plurality of separate outer casing members 890, 276, 278, 284, 282 mountable in enveloping relationship with the housing. The plurality of outer casing members have an attached state in fixedly mounted relationship with the housing and a disengaged state in non-touching relationship with the housing. The plurality of outer casing members are toolessly switchable between the attached state and the disengaged state.

The Housing Exterior Portions

FIGS. 1–5 illustrate a tower computer 10 comprising a sheet metal housing 12 having an outside surface 14 and an inside surface 16. The housing has central and intersecting longitudinal, lateral, and vertical axes XX, YY, and ZZ respectively. (All reference to "horizontal" and "vertical" herein assume the normal operating position of the computer or the subject component unless otherwise noted.) The sheet metal may be steel and may have a wall thickness of, e.g. 0.6 mm to 0.8 mm. Those having skill in the art will understand that other wall thickness dimensions and other types of metal may also be used.

Figure 4:
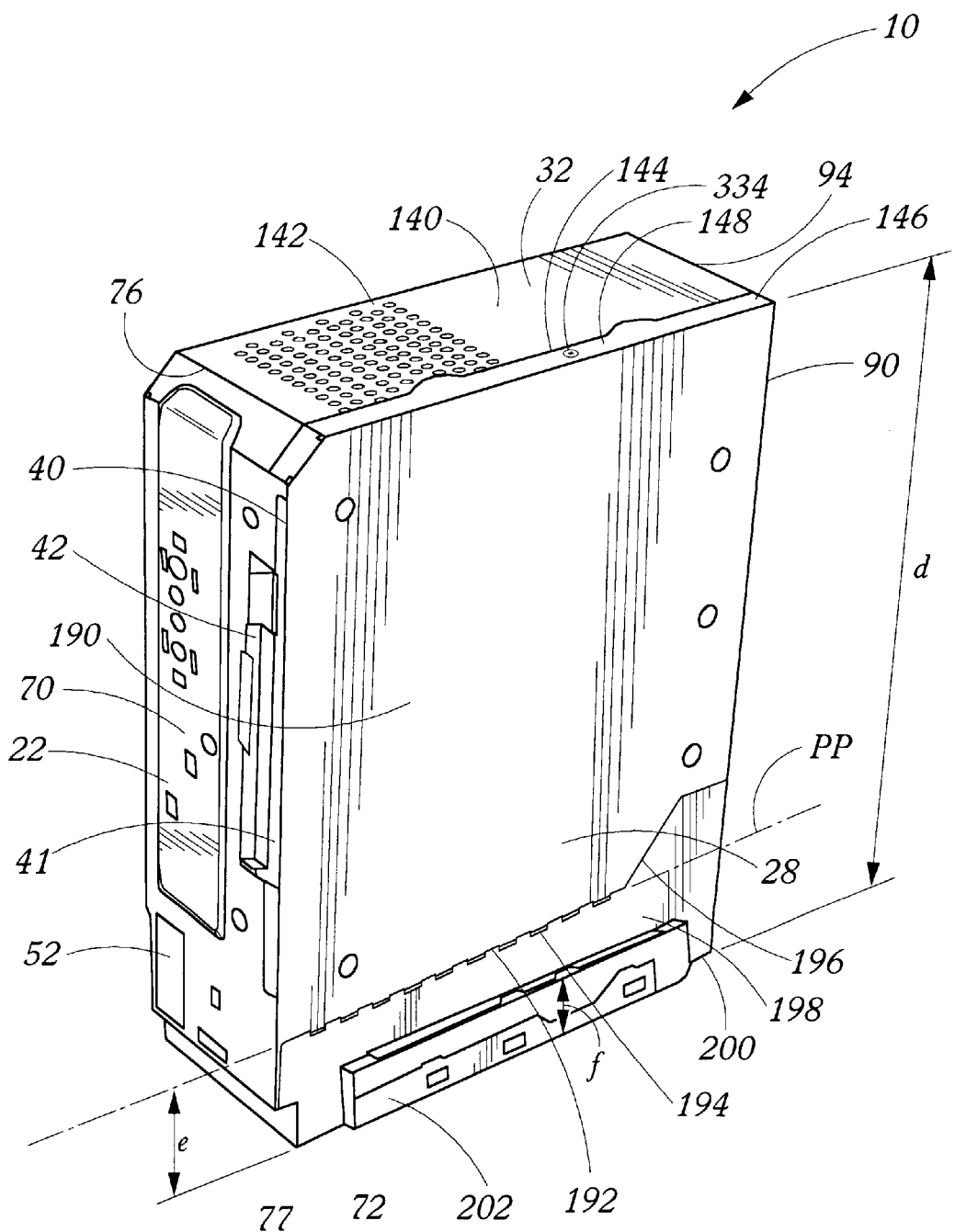
FIG. 4 is a top, front, right perspective view of a computer housing.

The housing 12 comprises a vertically and laterally extending front wall 22; a vertically and laterally extending rear wall 24; a vertically and longitudinally extending left lateral side wall 26; a vertically and longitudinally extending right lateral side wall 28; a longitudinally and laterally extending top wall 32 and a laterally and longitudinally extending bottom wall 34. The front wall terminates at a front wall/left wall vertical edge 38 on one side and front wall/right wall vertical edge 40 on the other side. A vertically extending flange portion 41 from the right wall overlaps the front wall terminating at vertically extending flange edge 43. A first narrow, rectangular, vertically extending opening 42 is positioned in a right side portion of the front wall 22. The opening has a top edge 44 a bottom edge 46 and first and second vertical edges 48, 50. A front face portion 412 of an optical drive extends therethrough as described in further detail below. A second generally rectangular opening 52 having a top edge 54, a bottom edge 56, a first vertical edge 58, and a second vertical edge 60 is positioned in a lower left hand portion of the front wall 22. The front wall comprises a generally flat, vertically and laterally extending panel portion 70 having a lower edge 71 and a top edge 78. Panel portion 70 contains openings 42 and 52. The front wall 22 has a generally flat, bottom recessed portion 72 parallel to portions 70 which has a bottom edge 73 and a top edge 75. Edge 75 and edge 71 define a generally longitudinally and laterally extending step portion 77 as best seen in FIG. 4. The distance between 71 and 75 may be, e.g. 90 mm. The distance between 73 and 75 may be, e.g. 20 mm. As best seen in FIG. 1, a top wall/front wall beveled transition portion 74 extends upwardly and rearwardly from edge 78 to a top edge 76. The distance between edges 76 and 78 may be, e.g. 20 mm.

Figure 3:
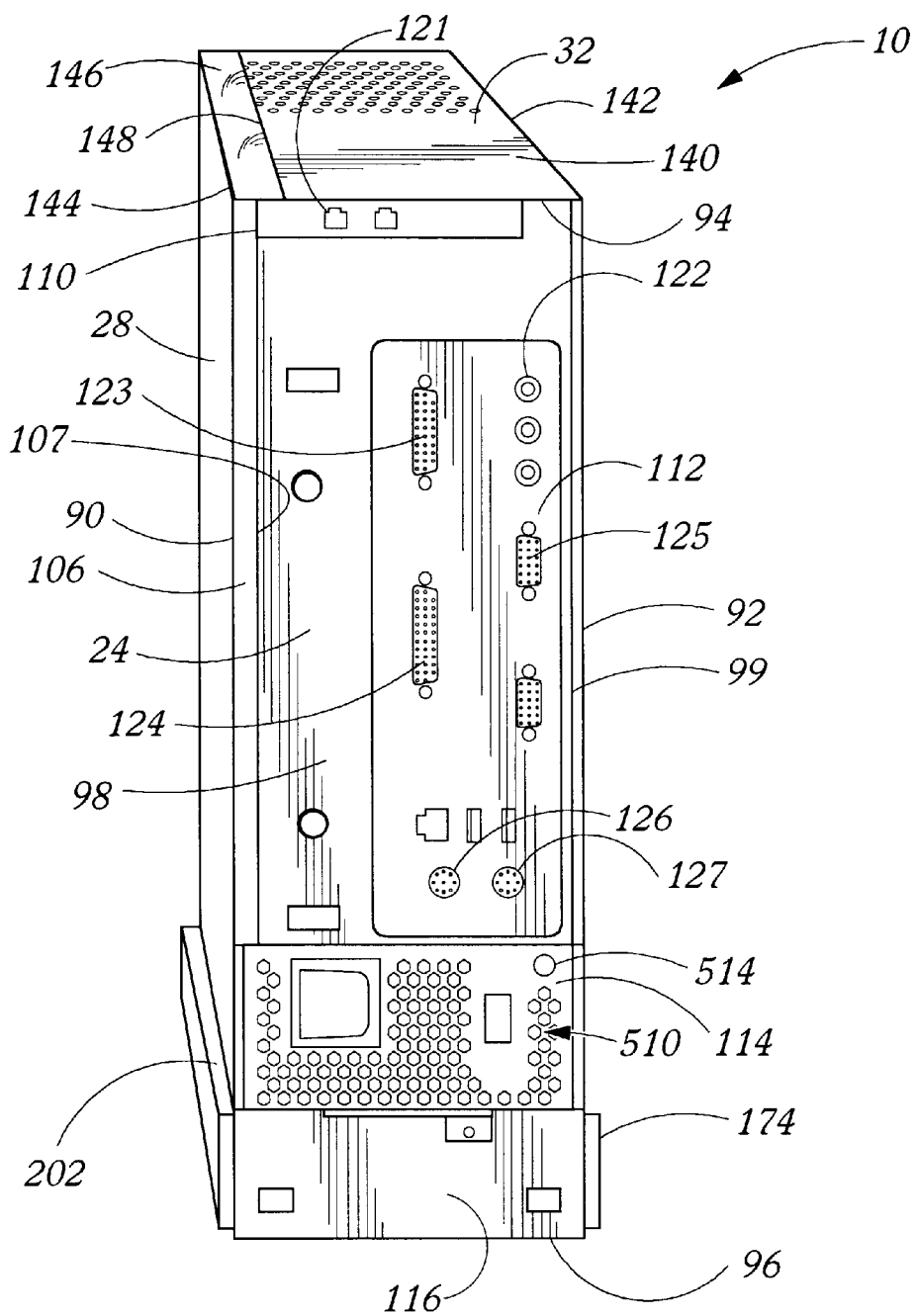
FIG. 3 is a top, rear, right perspective view of a computer housing.

Rear wall 24, FIG. 3, extends laterally between rear wall/right wall vertical edge 90 and rear wall/left wall vertical edge 92 and extends vertically between top edge 94 and bottom edge 96. The rear wall includes an upper generally flat face 98 which is recessed somewhat, e.g. 10 mm, from a first vertical edge strip defined by right wall vertically extending flange portion 106 and a second vertical edge strip 99 which are both longitudinally co-extensive with portion 98. Upper panel portion 98 has a first input/output ("I/O") port area 110 at a top portion thereof and a second I/O port area 112 positioned at an intermediate portion thereof. A power module rear face panel 114, described further below, is positioned immediately below panel portion 98 and a flat lower panel portion 116 is positioned below the power module panel 114.

The I/O ports may comprise conventional ports/connectors such as modem 121, speaker 122, game 123, parallel 124, monitor 125, mouse 126, and keyboard 127 ports, etc., for connecting the computer to typical I/O devices such as keyboards, displays, scanners, joysticks, etc. (none shown).

The top wall 32 comprises a flat horizontal panel 140 extending between a top wall/left wall edge interface 142 and a top wall right wall edge interface 144. A right wall flange 146 forms an overlapping portion of the top wall terminating at edge 148. A plurality of vent holes 152, 154, etc. are provided in the top wall to facilitate venting of air from a motherboard chamber described below.

Left side wall 26, FIG. 1, has a generally flat panel portion 162 extending from edge 92 to edge 38 longitudinally and from edge 142 to bottom edge 164 vertically, except for stair step or bump out portion 168. Stair step portion 168 has a laterally extending, e.g. 5 mm, front face portion 170 longitudinally set back, e.g. 25 mm, from the front wall panel 72 of the housing, and has a similar rear face 174 positioned forward, e.g. 25 mm, from the rear face 24. The stair step portion has a top face 176 and a bottom face which is an extension of bottom wall 34.

Right side wall 28, FIG. 4, has a flat upper panel portion 190 extending longitudinally between edges 40 and 90 and vertically between top edge 144 and a boundary defined by hinge line portion 194 and beveled step shaped edge portion 196. The right side wall also includes a flat bottom panel portion extending longitudinally between edges 40 and 90 and vertically between 194, 196, on the top and bottom edge 200 at the bottom, except for bump out/stair step portion 202 having generally an identical configuration to bump out portion 168 located on the opposite side wall 26.

Figure 5:
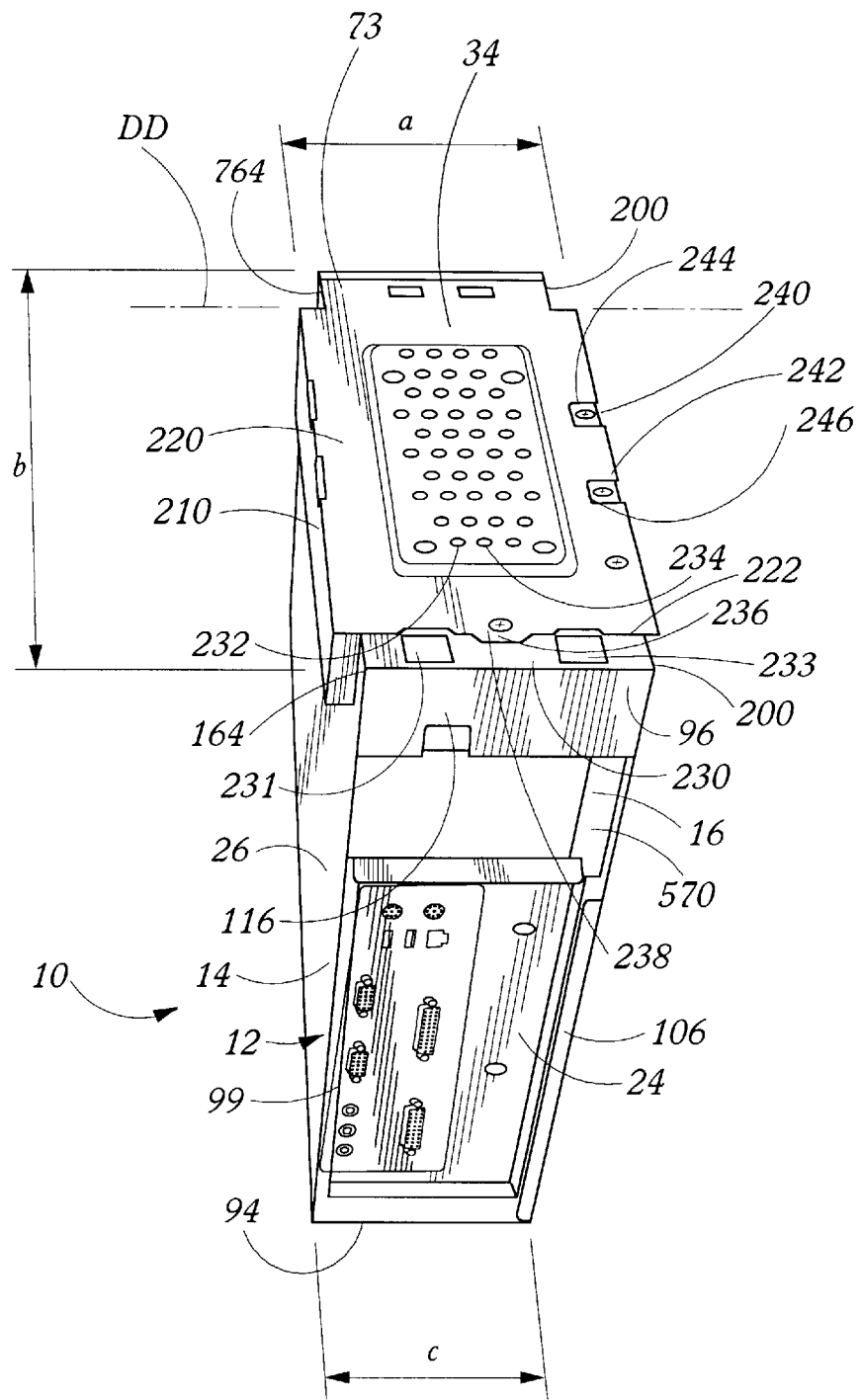
FIG. 5 is a bottom, rear perspective view of a computer housing with a power supply modular removed.
Figure 6:
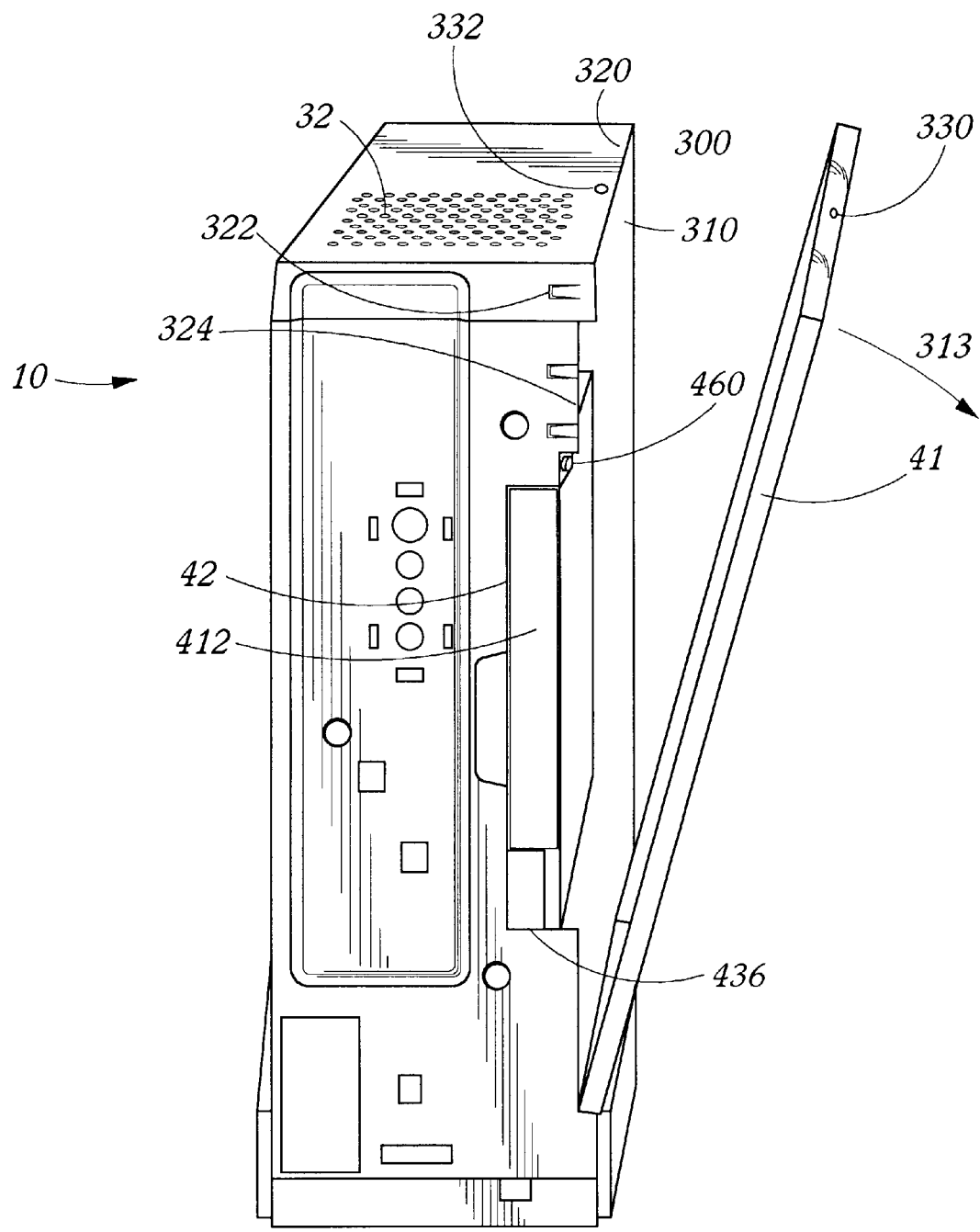
FIG. 6 is a front, right perspective view of a computer housing with a lateral side door panel partially open position.

As best shown by FIG. 5, bottom wall 34 comprises a forward flat panel portion 220 extending laterally between left bump out bottom edge 210 and right bump out bottom edge 212 at an intermediate portion thereof and between edges 164 and 200 at the extreme forward end thereof. The forward panel terminates at a rear edge portion 222 which overlaps with a second flat panel portion 230 which extends on the exposed exterior from edge 222 to rear edge 96. The forward panel 220 has vent openings such as holes 232, 234, etc. or slats (not shown) or the like provided therein and may include a recess portion 236 having a screw 238 received in a bore 766 therein, FIG. 18. Right side recess portions 240, 242 may be provided which have bores therein adapted to received screws 244, 246 for attaching a hard drive to an interior side of the panel 220 as described in further detail below.

Figure 23:
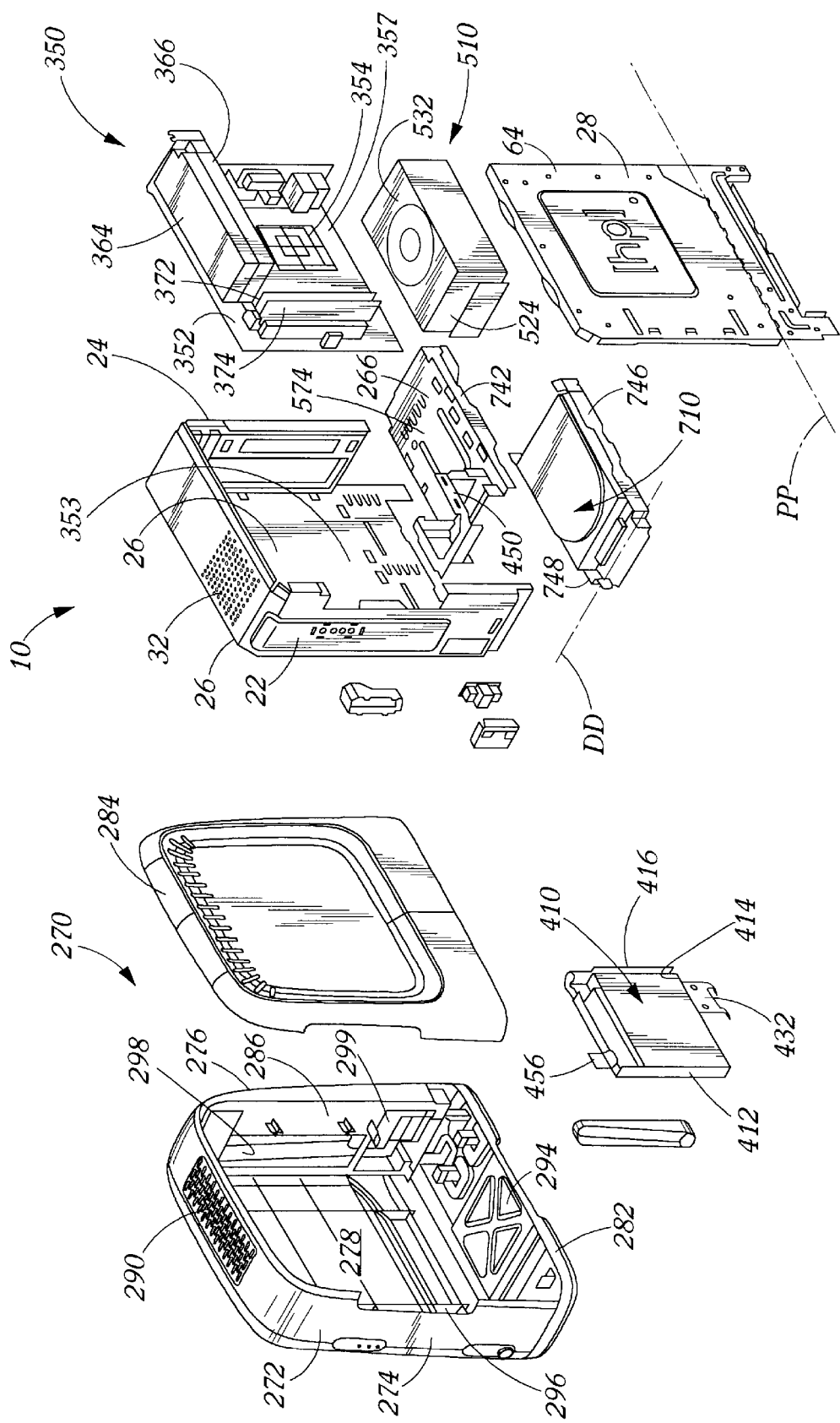
FIG. 23 is a partially schematic, exploded view of a tower computer.

In one embodiment, as illustrated by FIG. 23, the housing 12 may comprise a first integral subassembly 262 which includes front wall 22, left side wall 26, top wall 32 and an upper portion of rear wall 24. A second subassembly 264 is formed by the hinge connected upper and lower portions of right side wall 28. A portion of the rear wall 24 is formed by a rear portion of a power module 510. Another portion of the rear wall is formed by an intermediate wall subassembly 266. This assembly 266 also contains a bottom portion of the rear wall 24 and a portion of the bottom wall 34. The remainder of the bottom wall is in a bottom door assembly 268. The various subassemblies may be connected by conventional sheet metal connection means such as locking flanges, tabs and slots or other cut out portions, screw and threaded bore or screw and nut connection, rivets, solder, welds, etc.

The housing may have the following exemplary dimensions: a =105 mm, b=239 mm, c=90 mm, d=306 mm, e=70 mm, f=35 mm, as shown in FIGS. 4 and 5. It is to be understood that these dimensions are only exemplary and demonstrate dimensions suitable for accommodating specific computer components described elsewhere herein. It is to be understood that if computer components of different sizes were to be used or if such computer components were arranged somewhat differently than specifically described in the illustrated embodiment that the above exemplary dimensions would change. The variance of these dimensions to accommodate differently sized or other computer components than specifically described herein, would, after reading this disclosure, be obvious to a person with ordinary skill in the art and accordingly will not be further discussed herein. It is to be understood that the invention is not to be limited to any of the above dimensions except to the extent such dimensions are expressly recited in one or more of the following claims.

As shown by FIG. 23, the housing 12 may be encased in an aesthetically pleasing, high strength plastic (e.g. ABS plastic) casing 270 which, in general, may comprise a front portion 274, rear portion 276, left panel 278, top portion 280, bottom portion 282, and a right panel 284. The left and right panels are adapted to be removeably mounted, as by press release locking tabs, onto other portions of the casing 270. The casing may have vent holes in a top portion 290 and a raised bottom portion 294 thereof. Cut outs 296, 298, 299, etc. in the casing 270 are constructed and arranged to expose a removable media drive front face 412, a power supply assembly rear face 512 and the various I/O ports. Preferably the casing is constructed in a manner, e.g. using studs and press release tabs, screws, etc., to enable the sheet metal housing 12 to be mounted therein or removed therefrom very rapidly, e.g. in less than thirty seconds. However it is to be understood that the definition of "modular" and "readily-accessible" provided below is with reference only to the housing 12 and does not take into account any time which may be required in removing any portion of casing 270 or time which may be required in removing housing 12 from casing 270, if necessary, to access a particular component. The casing 270 is described in further detail below.

Motherboard Bay

As best illustrated in FIGS. 6–10 the computer 10 has a motherboard access bay 300 accessible through an access opening 310 in the right lateral side 28 of the sheet metal housing 12. The opening is removably covered by a side panel door 312 which may be comprised of side wall flat upper panel portion 190 and flanges 41, 106, 146, FIG. 4. In the illustrated embodiment the side panel door 312 is pivotally mounted to the housing by hinge portions 314, 316 on the door 312 and housing 12 which have a pivot pin (not shown) received therein to define a pivot access PP. The side panel door 312 flange portions 106, 146, 41 overlap the adjacent portion of the rear top and front sides of the housing when the door is shut. These door flange portions co-act with flange portions 318, 320, 322, 324, 326, positioned about the periphery 328 of the access opening 310. More specifically, the flange portions 318, 320, 322, 324, 326 are biased to the position shown in FIG. 7 and are urged elastically inwardly by the flange portions on the side panel door 312 as the door is closed. Thus, the housing and door flange portions have surfaces which abut when the door is closed and those abutting surfaces are urged together by the elastic restorative forces of both sets of flanges. As a result, there is substantial sliding friction between these abutting surfaces which tends to retain the door in a closed position once it has been closed. To further prevent the door from opening a screw 334, FIG. 4 may be received in a hole 330 in door top flange 146 and thread bore 332 in housing top flange 320. Of course, any number of door holding or arrangements might be employed to hold the door in a closed position such as conventional cabinet latching assemblies, snap lock assemblies, hook and catch assemblies, etc.

Figure 9:
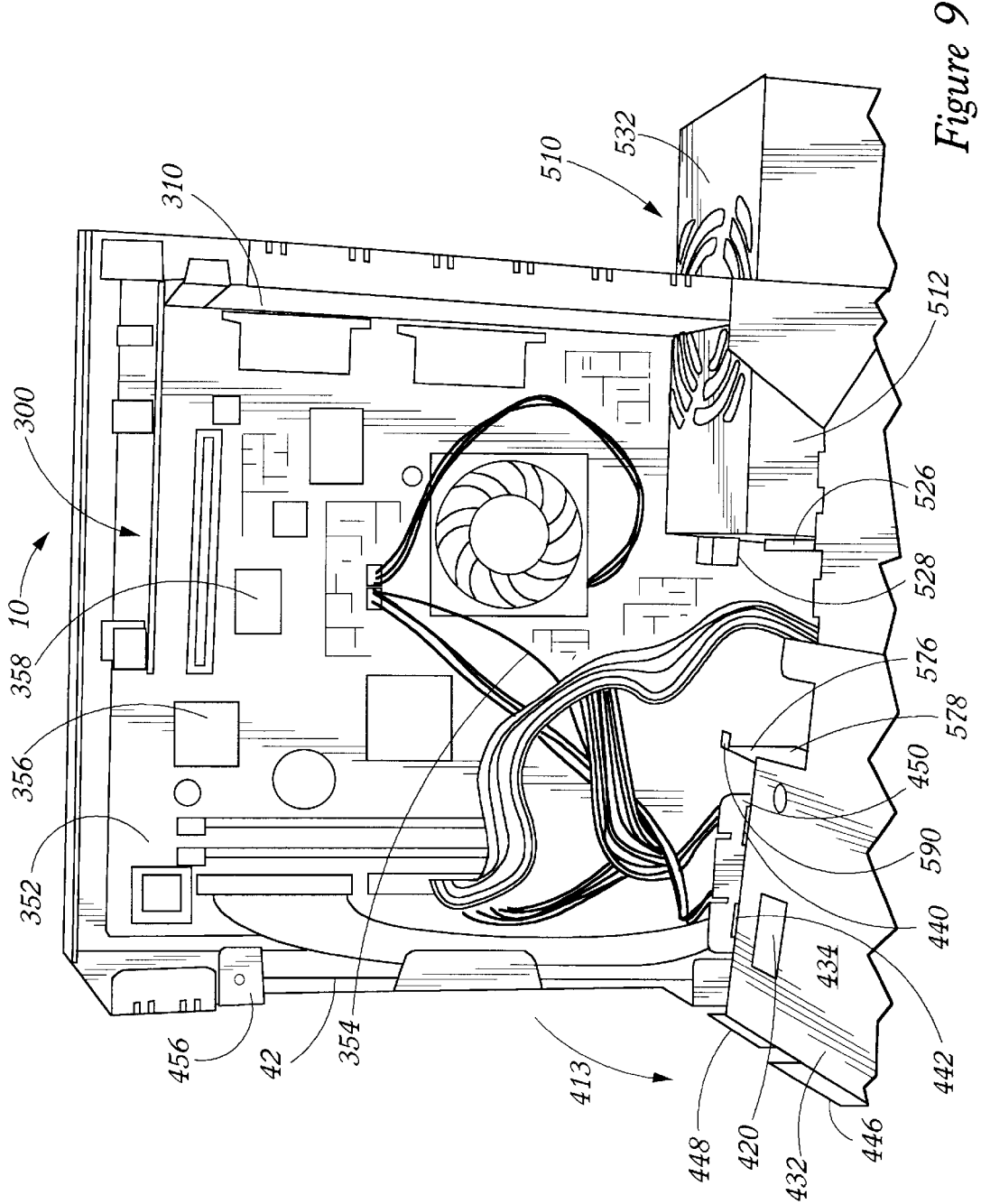
FIG. 9 a detail right elevation view of a computer housing having a door panel thereof in an open position and showing a power supply assembly in a partially removed state.
Figure 10:
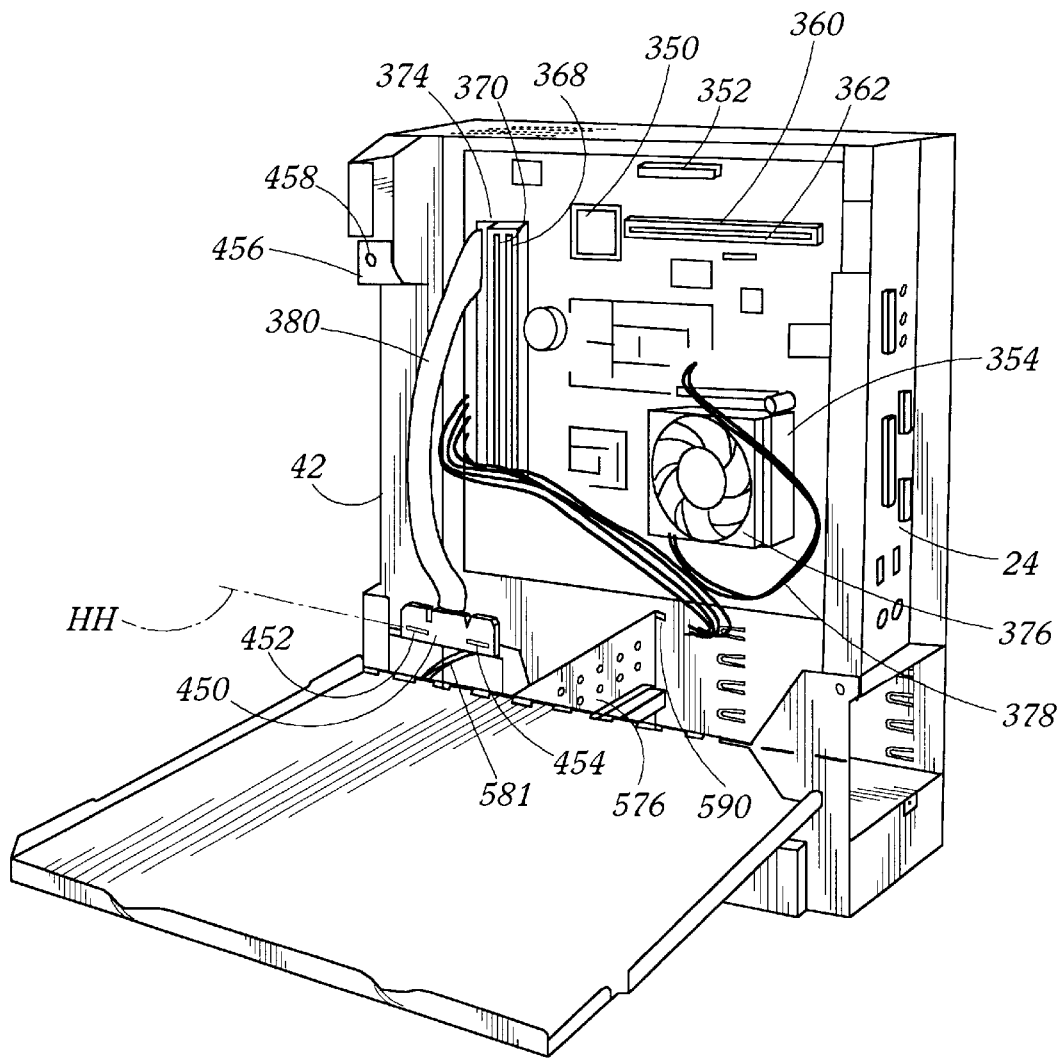
FIG. 10 is a rear, right side perspective view of a computer housing with a lateral side door panel in an open position and with a power supply assembly removed.

A motherboard assembly 350, best illustrated in FIGS. 9, 10, and 23 comprises a substrate 352 having a back side 355 mounted in abutting relationship with an interior wall surface 353 of housing lateral side wall 26. The substrate may be mounted on the wall surface by conventional means, for example by screws, rivets, etc. The substrate 352 has a front side 357 with a central processing unit (CPU) 354 mounted at a central portion thereof. Various circuit devices 356, 358, etc., expansion card slots 360, 362, for receiving expansion cards 364, 366, FIG. 23, therein; memory chip slots 368, 370 for receiving memory chips 372, 374 therein; etc., are provided on the substrate 352. A CPU cooling fan 376 may be mounted directly on the CPU. The various components of the motherboard assembly are sometimes referred to herein as "motherboard components" or as being "mounted on the motherboard."

Various signal and power cables 378, 380 extend into the motherboard bay 300 and are operably connected to the motherboard assembly. The motherboard assembly may be of different types having different sizes and shapes. In the illustrated embodiment the motherboard is an Intel Micro ATX form factor motherboard having a rectangular shape with dimensions up to 190.5 mm in height (as assembled in housing) by up to 216 mm in length. The motherboard bay 300 preferably has substantially the same length and height as the motherboard and has a width about the same as the housing width "c" which in the exemplary embodiment is 90 mm. The motherboard bay preferably has a length to width ratio of at least 1.5 and preferably at least 2.0 and most preferably at least 2.5. The motherboard may be conventionally electrically connected to the various I/O ports, media drives, power supply, etc. Except for these various electrical connector cables the motherboard bay 300 is substantially free of other computer components (for example free of other computer components except for a media drive) thus a relatively large amount of cooling air space within the motherboard bay is provided. In preferred embodiments the motherboard bay 300 is at least 80% free air space and, more preferably, at least 85% free air space and most preferably 89%±5% free air space.

The sheet metal walls around the motherboard bay 300 provide EMI shielding as well as physically protecting the motherboard assembly and creating a plenum chamber for providing a cooling airflow over the motherboard assembly.

Removable Media Drive

One computer component other than the motherboard assembly 350 which is located in the motherboard bay 300 is a media drive assembly 410 which in the illustrated embodiment is a removable media drive such as an optical CD or DVD drive having a rotation access RR. The drive has central intersecting longitudinal lateral and vertical axes $X_1X_1, Y_1Y_1, Z_1Z_1$. Axis RR is disposed laterally and horizontally when the drive is in its normal operating position shown in FIGS. 7 and 8.

Figure 2:
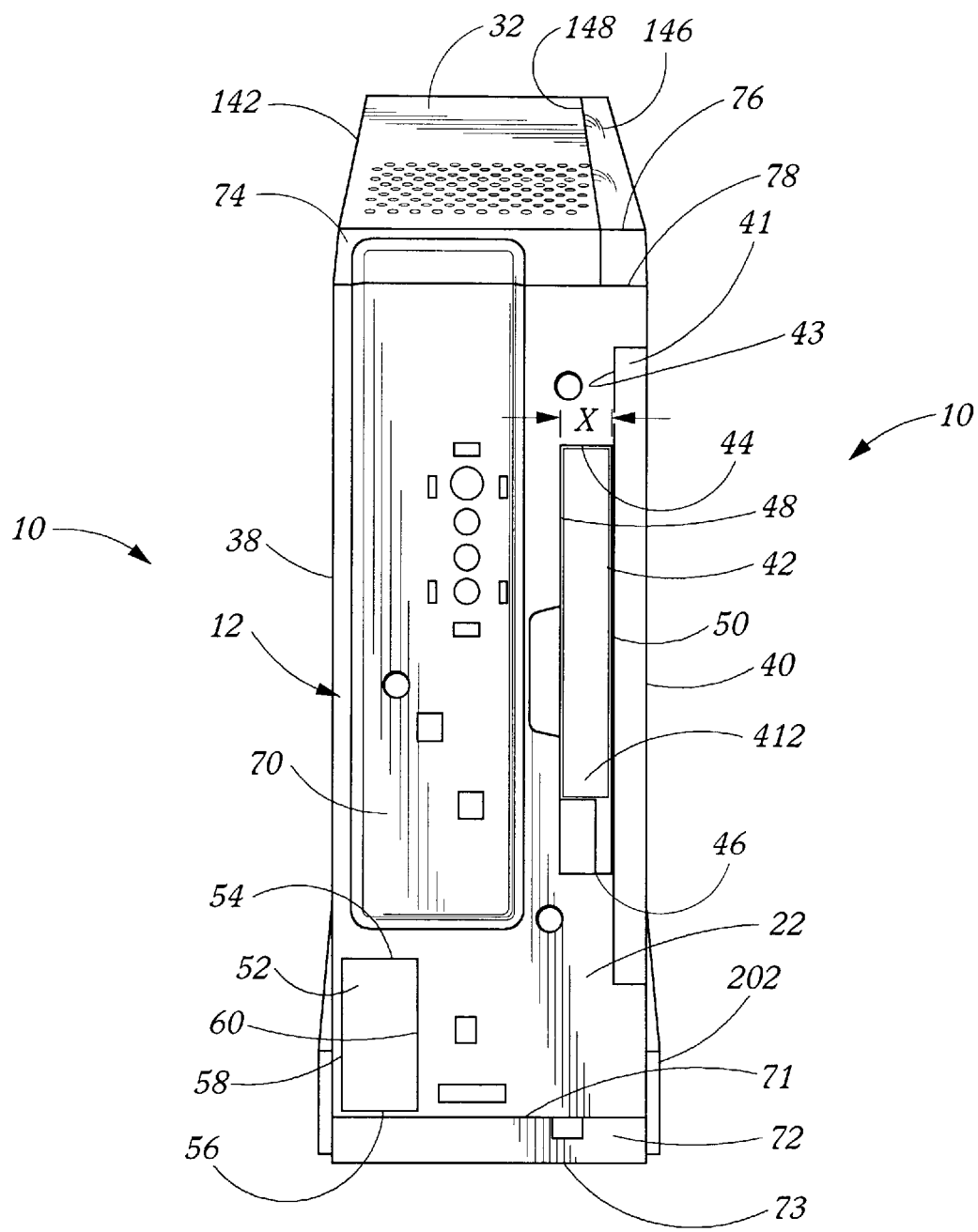
FIG. 2 is a top, front perspective view of a computer housing.

The removable media drive 410 has a front face 412 which is positioned in the first opening 42 in the front wall 22, FIGS. 1 and 2. The front face 412 may be for a drive of the type which receives an optical disk through a front slot portion thereof or, alternatively, and as shown in the illustrated embodiment may be of the type which has a longitudinally displaceable tray which projects outwardly from the front face (not shown) to enable placement of a media disk on a drive spindle (not shown). Both types of disk loading mechanisms are well known in the art and will not be further described herein. The drive front face may have a vertical dimension "j" of e.g., 130 mm.

Figure 7:
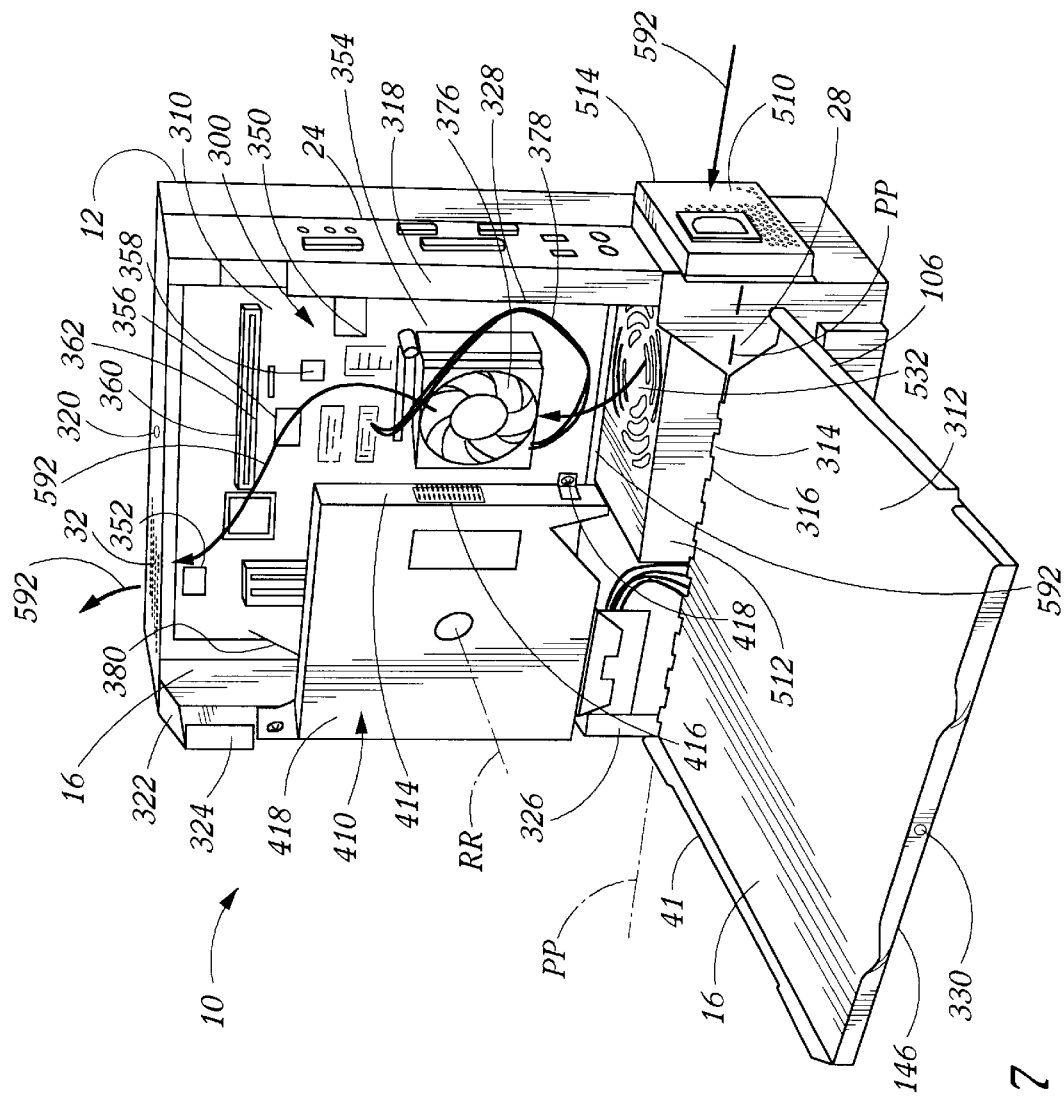
FIG. 7 is a rear, right perspective view of a computer housing with a lateral side door panel in an open position and with a power supply assembly part removed.
Figure 8:
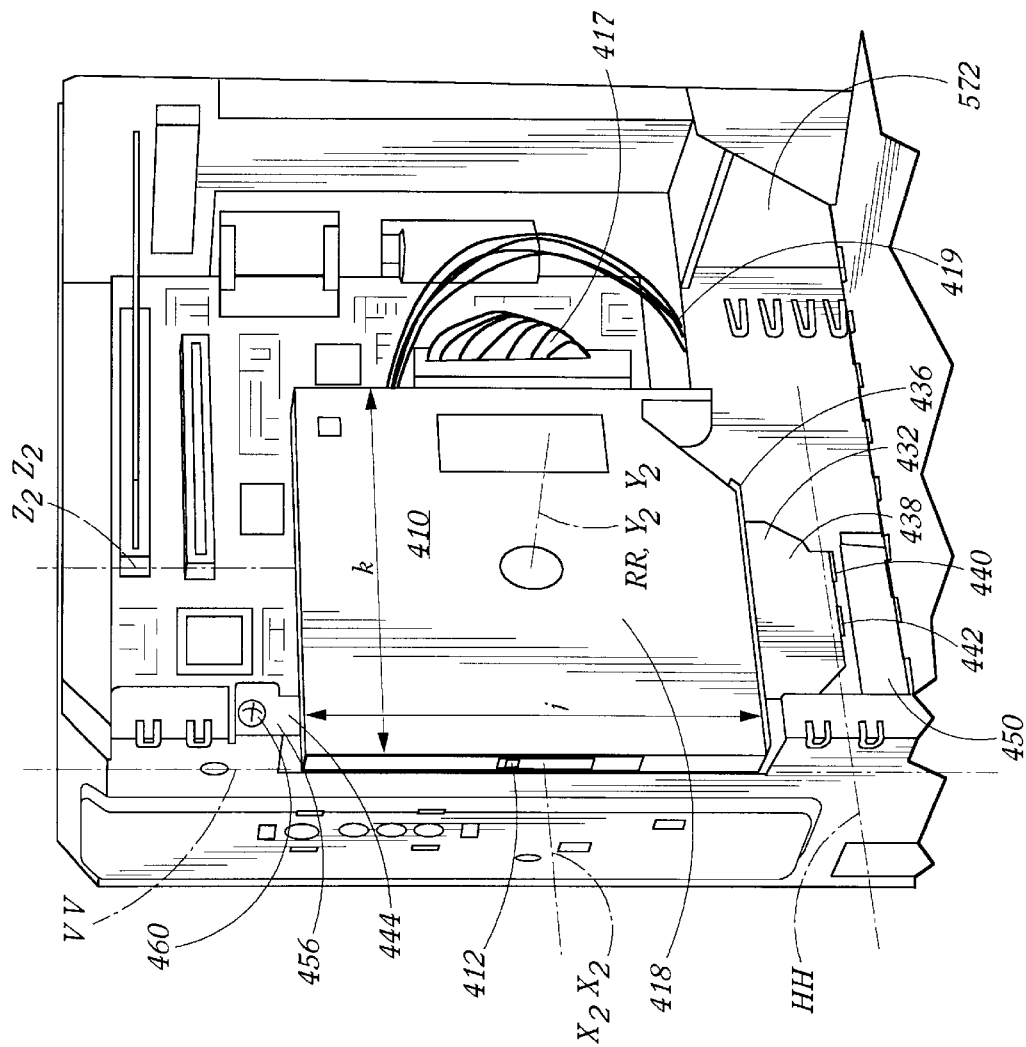
FIG. 8 is a detail front, right perspective view of a computer housing with a lateral side door panel in an open position and with a power supply assembly removed.

The drive has rear face 414 which may have a signal cable adapter 416 mounted thereon for removable connection to a signal cable 417 and may also have a power cable adapter 418 mounted thereon for removable connection to a power cable 419. FIG. 8 illustrates the drive 410 with cables connected and FIG. 7 illustrates the drive with cables removed. The drive further comprises a first and second lateral side faces 418, 420 which may have a longitudinal dimension "k" of 130 mm, and a top face 422 and bottom face 424 having a lateral dimension "I", FIG. 2, which may be e.g., 13 mm.

The drive 410 is mounted on a drive bracket 432 having vertically and longitudinally extending body portion 434, FIG. 9, which abuts drive side wall 420. The bracket 432 also includes a horizontally extending lower portion 436, a vertically extending lower tab portion 438 and curved foot portions 440, 442 projecting from the lower tab portion 438. The bracket further comprises an upper tab portion 444, FIG.8, having a screw receiving hole therein and front alignment tabs 446, 448, FIG. 9.

A second bracket 450 fixed to the housing as by screws (not shown) attached to an intermediate horizontal wall 574, FIG. 23, has longitudinally extending slots 452, 454, which define a pivot axis HH.

A top drive mounting flange 456 is fixedly attached, e.g. integrally, to the housing and may have a screw hole therein 458 which is alignable with the screw hole in upper tab portion 444 whereby a screw 460 may be used to secure upper tab portion 444 to flange 456. Various alternative releasable attachment means could of course be used in place of the screw attachment, for example a spring metal tab (not shown) or hook and catch (not shown), etc.

The lower curved foot portions 440, 442 of bracket 432 may be slidingly, rotationally displaceably, received in slots 452, 454. The curved foot portions 440, 442 and the bottom bracket 450 hold the lower portion of drive bracket 442 in stable stationary relationship with the housing 12 when the upper tab portion 444 is secured to top drive mounting flange 456. When the upper end is released the drive 410 and attached bracket 442 may be pivoted horizontally about axis HH to the generally horizontally disposed position shown in FIG. 9. Thereafter, if desired, the drive and attached bracket 442 may be moved laterally away from bracket 450 to entirely remove foot portions 440, 442 from slots 452, 454 and thus detach the drive and attached drive bracket 442 from the housing 12. The signal and power and audio cables 417, 419 may be hand disconnected from the back of the drive, either before or after disengagement of the drive from bracket 450, to enable the drive to be completely removed from the housing for replacement, repair, etc., FIG. 10.

It will of course be appreciated that with the drive positioned in the pivotally displaced position shown in FIG. 9 or entirely removed from the housing as shown in FIG. 10 that all regions of the motherboard assembly 350 are easily accessible. Thus a user may quickly and easily add expansion cards or memory to the computer without using special tools and without technical skills or training. Similarly a technician may quickly and easily access and test any portion of the motherboard assembly 350. In the illustrated embodiment it is necessary only to remove screw 334 from the top of access 312 door; open the door 312 by pivoting it in direction 313, remove screw 460 or release a spring tab, etc., from drive bracket tab 456, pivot the drive in direction 413 and, if necessary, hand remove cables 417 and 419. The entire operation can typically be performed by a person with no technical experience who has recently performed the same operation at least once before, in less than three minutes. Thus the entire motherboard is readily-accessible. The phrase "readily-accessible" when used herein to refer to a computer component such as a motherboard means that unobstructed access may be obtained to that computer component by an average person, with no technical experience who has recently performed the same operation at least once before, in less than three minutes and without using special tools. It is to be understood that this definition of "readily-accessible" is with reference only to the housing 12 and does not take into account any time which may be required in removing any portion of casing 270 or time which may be required in removing housing 12 from casing 270, if necessary, to access a particular component.

Although a lower horizontal pivot axis HH has been described with reference to the illustrated embodiment, it is also to be understood that by flipping the relationship of the various bracket components, an upper horizontal pivot access could easily be provided. Further, it will be understood that by pivotally mounting a drive bracket such as 432 about a vertical pivot access such as VV, FIG. 8, at a front end portion of the drive, that the drive would also be pivotally displaceable about such a vertical axis to enable access to motherboard components positioned behind the drive 410.

It is to be noted that the drive 410, in its normal operating position illustrated in FIGS. 7 and 8, is positioned with one lateral face 418 positioned next adjacent to side panel door 312 (when the door is in the closed position) and with its smallest dimension "I" projecting into the motherboard bay 300. Thus, the drive 410 is positioned in substantially nonrestricting relationship with airflow through the motherboard bay 300 while in its normal operating position, i.e. the airflow rate through the motherboard bay with the drive in this position is at least 90% as great as the airflow rate with the drive completely removed.

Also, the drive 410 is readily-displaceable from its normal operating position, shown in FIG. 8, to a position in noninterfering relationship with the motherboard, such as shown in FIG. 9, to enable access to portions of the motherboard that are positioned behind the drive 410 when the drive is in its normal operating position. The phrase "readily-displaceable" when used herein means that a component may be moved from the one referenced position to the other by an average person with no technical experience who has recently performed the same operation at least once before, in less than three minutes and without special tools. It is to be understood that this definition of "readily-displaceable" is with reference only to the housing 12 and does not take into account any time which may be required in removing any portion of casing 270 or time which may be required in removing housing 12 from casing 270, if necessary, to displace the particular component from one position to the other.

Drive 410 is also modular. The term "modular" when used herein to refer to a computer component means a component which may be completely removed by an average person with no technical experience who has recently performed the same operation at least once before, in less than three minutes and without special tools. It is to be understood that this definition of "modular" is with reference only to the housing 12 and does not take into account any time which may be required in removing any portion of casing 270 or time which may be required in removing housing 12 from casing 270, if necessary, to remove the particular component. The phrases "readily-removable" or "readily-removably-mounted" are also used herein to refer to a component which is "modular," as defined above.

Power Supply Assembly

Figure 11:
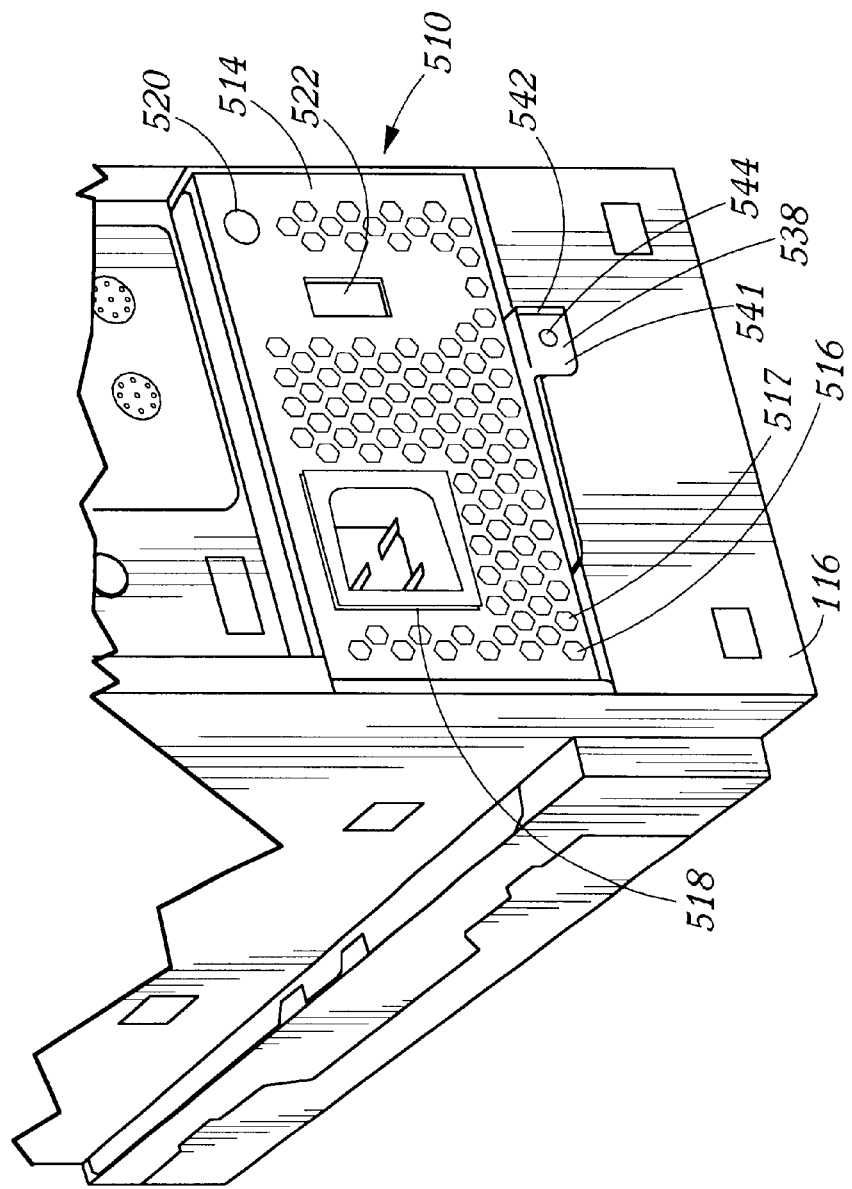
FIG. 11 is a detail, rear, right perspective view of a lower portion of a computer housing with a power supply assembly in a seated position.

A power supply assembly 510 for computer 10 is best illustrated in FIGS. 3, 7, 9, and 11–16. The power supply assembly 510 comprises a parallelepiped shaped housing 512 having a rear face 514 which, in its normal operating position, provides a portion 114 of housing rear wall 24, FIG. 3. The rear face 514, as best shown in FIG. 11, has a rectangular shape and has a plurality of vent holes 516, 517, etc. It also has a power cord socket 518; an indicator light 520, which indicates that the power supply if functioning normally; and a universal voltage selector switch 522, all of which are conventional and well known in the art.

The housing 512 has a relatively flat rectangular front face 524 having a high density power connector 526 mounted at a lower portion thereof and an AC interlock 528 mounted at an upper corner portion thereof. Power connectors and AC interlocks are well known in the art.

Housing 512 has a top face 532 having a plurality of airflow openings 534 provided therein.

Figure 14:
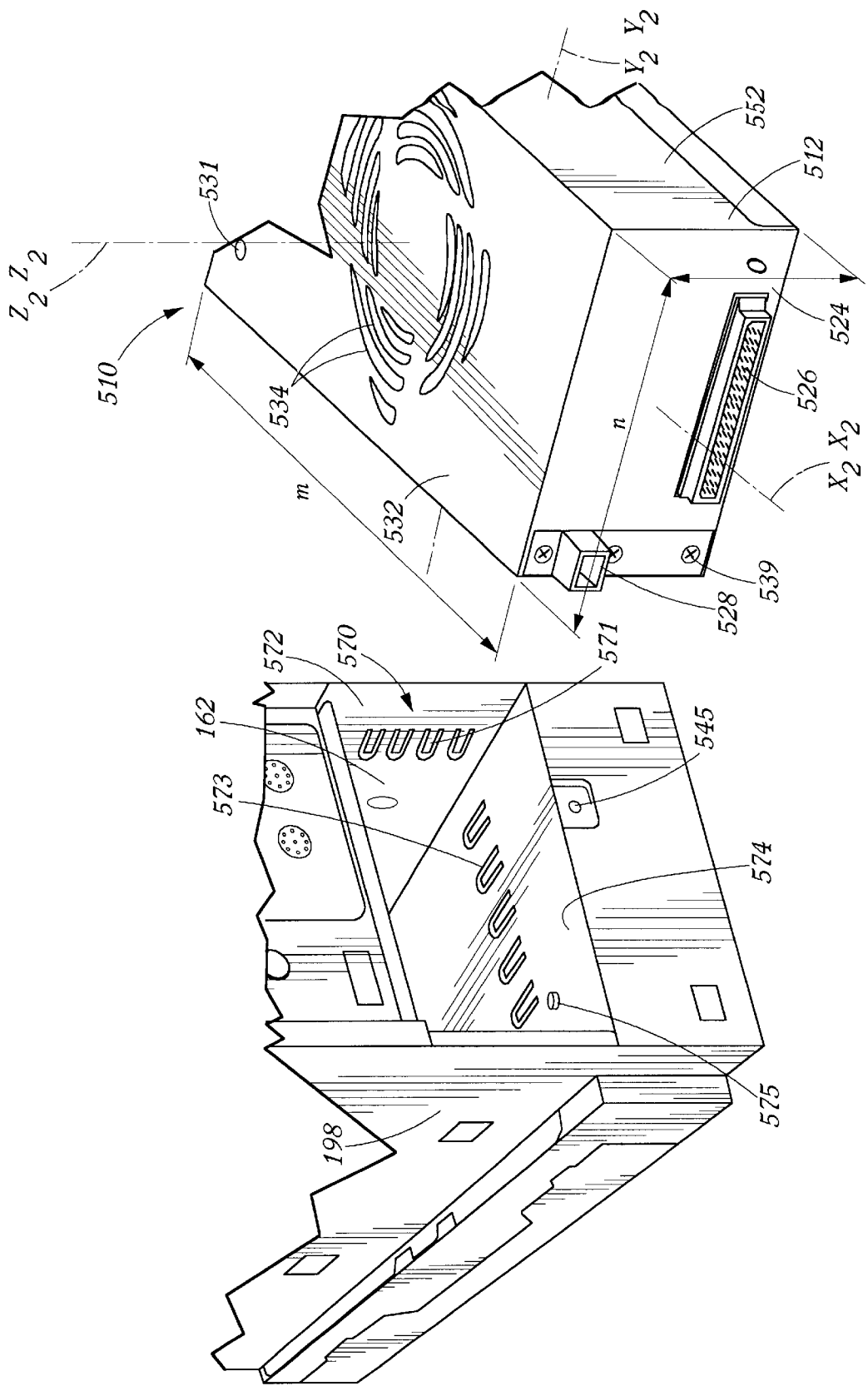
FIG. 14 is a detail, rear, right perspective view of a lower portion of computer housing with a power supply assembly removed.
Figure 15:
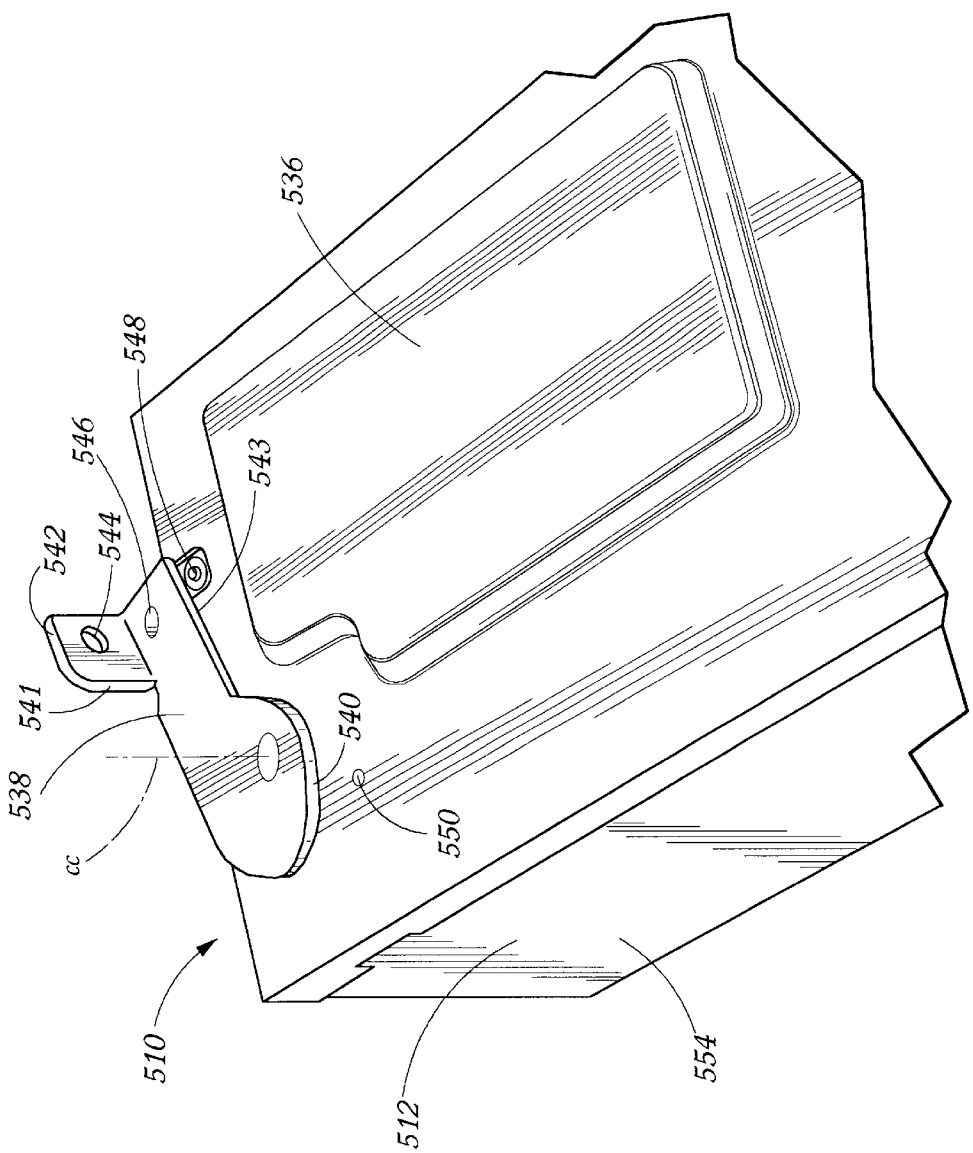
FIG. 15 is a bottom, right perspective view of a rear portion of a power supply assembly.

The power supply housing 512 has a flat rectangular bottom face 536 having a cam lever 538 rotatably mounted thereon, FIG. 15. Cam lever 538 has a vertically extending rotation access CC and a vertically extending cam surface 540. A first vertical tab portion 541 and a second vertical tab portion 542 are provided at the free end 543 of the cam lever. The first tab portion 541 has a hole 544 extending therethrough. Hole 544 is alignable with a corresponding hole 545 in the housing rear wall portion FIG. 14. The cam lever 538 also has a vertically extending detent hole 546 therein adapted to receive a detent stud 548 which is vertically defectively mounted on the bottom face 536 as by a partially cut out, cantilevered, sheet metal tongue supporting the upstanding post.

Figure 16:
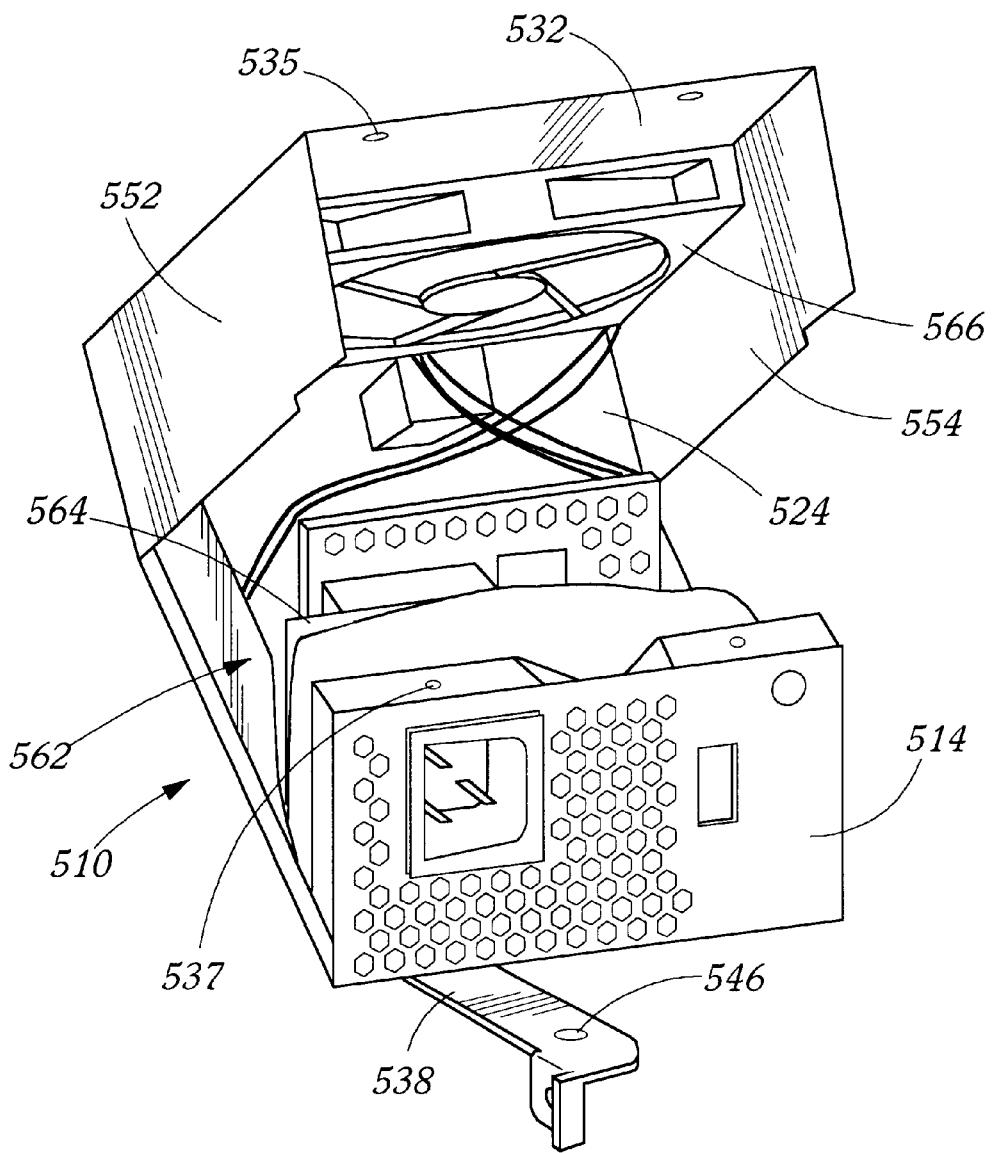
FIG. 16 is a top, rear perspective view of a partially disassembled power supply assembly.

The power supply housing 512 further includes a rectangular right face 552 and a rectangular left face 554. In one exemplary embodiment the power supply has a longitudinal dimension or length "m" of 152 mm, a lateral dimension or width "n" of 83 mm and a vertical dimension or height "o" of 57 mm. It has central intersecting longitudinal lateral and vertical axes $X_2X_2$, $Y_2Y_2$, $Z_2Z_2$. As best illustrated in FIG. 16 the modular power supply assembly 510 includes an electrical power assembly 562 having various electrical components 564, etc. which may be conventional power supply components. The electrical power supply assembly 510 also comprises a power supply cooling fan 566 mounted inside hosing 512. Preferably the electrical components 564, etc. are provided in a lower portion of the housing and cooling fan 566 is fixedly attached to the wall defining top face 532 with the rotation access of the fan positioned parallel to the central vertical axis $Z_2$ $Z_2$ of the power supply assembly.

Figure 17:
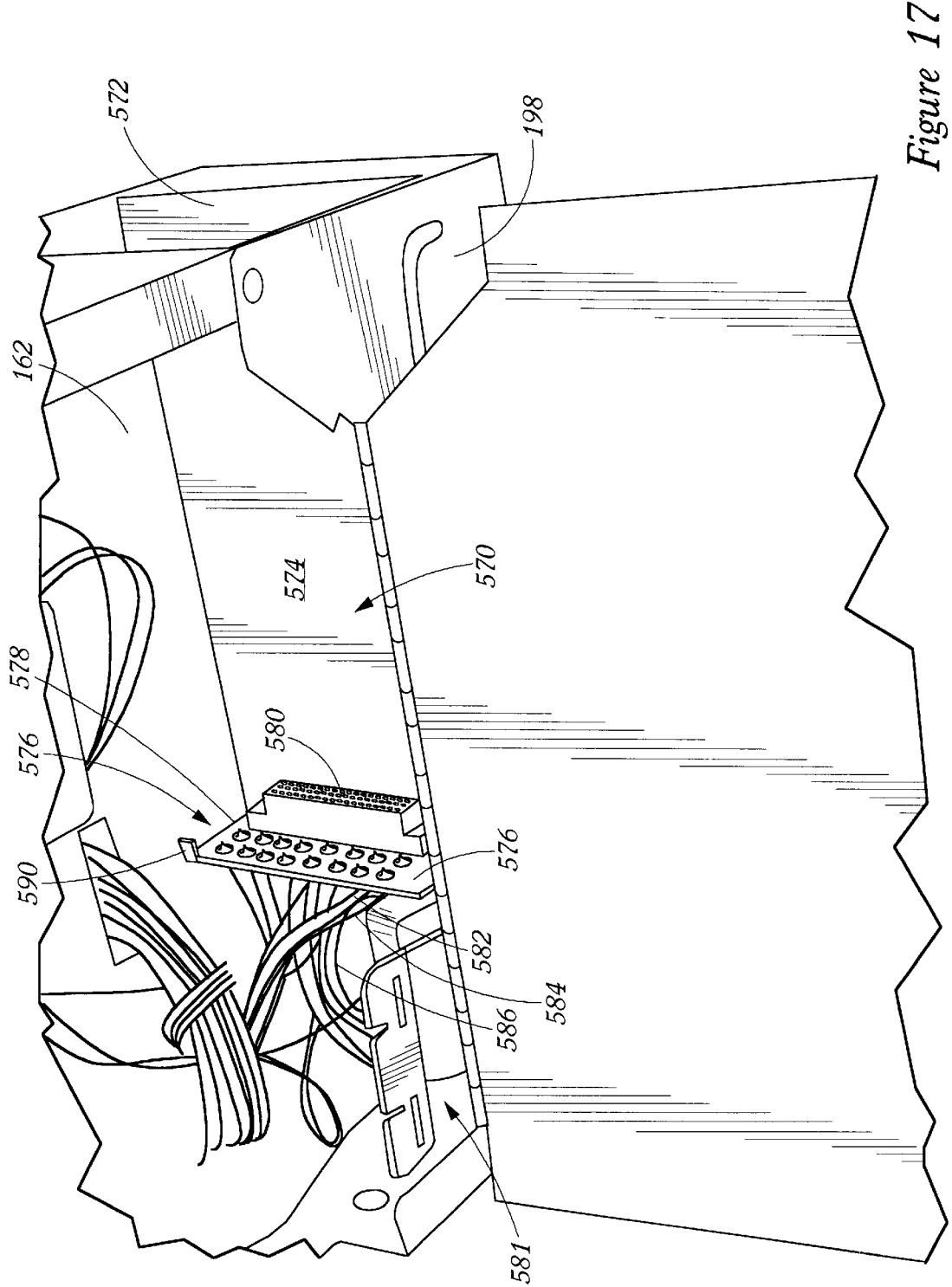
FIG. 17 is a detail top, right perspective view of a lower portion of a computer housing with a lateral side door panel in an open position and illustrating details of a power supply bay.

The power supply assembly 510 is slidingly receivable in a power supply bay 570, FIG. 17, having a rectangular bay access opening 572. Opening 572 has substantially the same shape as the front and rear faces of the modular power supply housing 512 with slightly larger dimensions, e.g., 2 mm larger in each of the vertical and lateral directions. The bay 570 is defined by a longitudinally and a laterally extending wall 574 which is horizontal in the normal operating position of the computer 10. Wall 574 is positioned a short distance, e.g. 32 mm above and extends parallel to the housing bottom wall 34. A cam post 575, FIG. 14, is mounted on intermediate wall portion 574 and co-acts with cam lever 538 on the power supply housing 512. Its relative position with respect to the cam surface of the cam lever is shown at 550 in FIG. 15.

The power supply bay 570 is also defined by vertically and longitudinally extending lower panel portion 198 of the right side wall and lower panel portion 162 of the left side wall. As best illustrated by FIG. 17 the forward end of the power supply bay 570 is defined by a generally vertically and laterally extending electrical connector assembly 576 which includes a substrate 578 upon which is mounted a high density power connector socket 580 which in the illustrated embodiment is a female socket. The substrate has a plurality of power lines 582, 584, 586 connected to a forward portion thereof which are in turn connected through the substrate to the socket 580. The electrical connector assembly 576 also defines a rear portion of a lower forward chamber 581 through which various power and signal lines are passed to connect various computer components. The electrical connector assembly 576 also has an AC interrupt actuator stud 590 mounted therein which co-acts with the AC interrupt 528 mounted on the front wall of the modular power supply housing 512.

The normal operating position of the modular power supply within the power supply bay 570 is with male supply socket 526 positioned in seated mating relationship with female power supply socket 580 and with AC interrupt actuator stud 590 positioned in mating engaged relationship with the AC interrupt 528. This position is illustrated in FIGS. 3 and 11 in which rear wall portion 510 of the power supply housing in positioned in flush relationship with lower panel 116. In this normal operating position the cam lever 538 is positioned slightly to the right of center of the power supply rear face with screw hole 544 thereof in alignment with housing panel 116, screw hole 545. A recess 547 may be provided in panel 116 to receive the cam lever first tab portion 541 in abutting relationship therewith. To prevent accidental actuation of the cam lever a screw (not shown) may be inserted through hole 544 and screwed into threaded bore 545. The cam lever 538 is maintained in the position illustrated in FIGS. 3 and 11 even without a screw through bores 544 and 545 by the co-action of detent hole 546 with detent stud 548.

Figure 12:
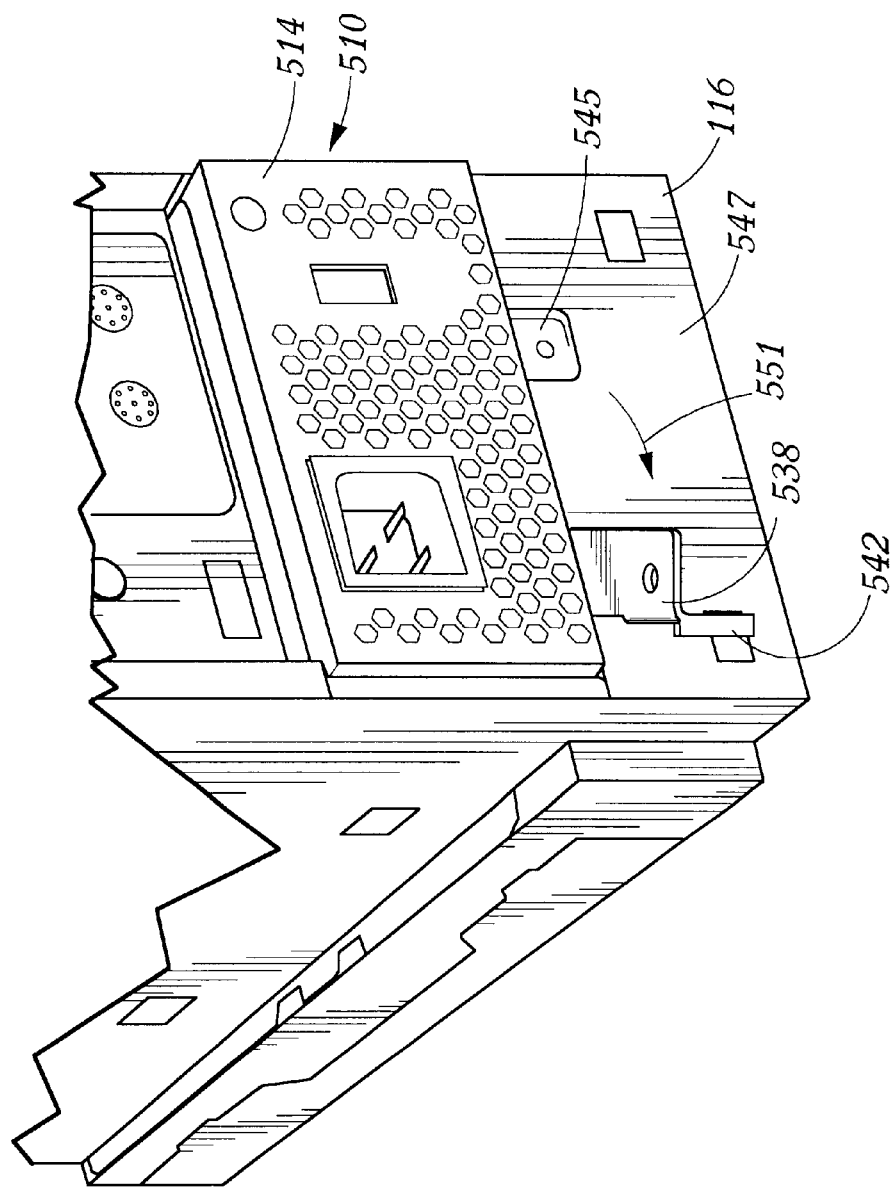
FIG. 12 is a detail, rear, right perspective view of a lower portion of a computer housing with a power supply assembly in an unseated position and with a cam lever in an actuated position.

To remove the modular supply assembly 510 from power supply bay 570 cam lever 538 is engaged, as with a person's thumb positioned on the right side of tab portion 542, and urged to the left as indicated at 551 in FIG. 12. The hand application of force in direction 551 is sufficient to cause the detent stud 548 to be displaced out of the detent hole 546 and thus allow movement in direction 551. As further indicated in FIG. 12 and also in FIG. 7 the movement of the cam lever in direction 551 causes cam surface 540 to co-act with cam stud 575 and thus move the attached power supply assembly 510 rearwardly to the position indicated in FIGS. 12 and 7. In this position the high density power socket 526 has been disconnected from corresponding socket 580 in the power supply bay and AC interrupt 528 has been displaced from AC interrupt stud 590 sufficiently to trip the AC power supply connection.

Typically, the AC interrupt is set to trip much sooner than the high density power socket disconnection point. For example, the AC interrupt may be disconnected after 2 mm rearward travel whereas the high density connector 526 will be disconnected after about 5 mm of rearward travel.

Figure 13:
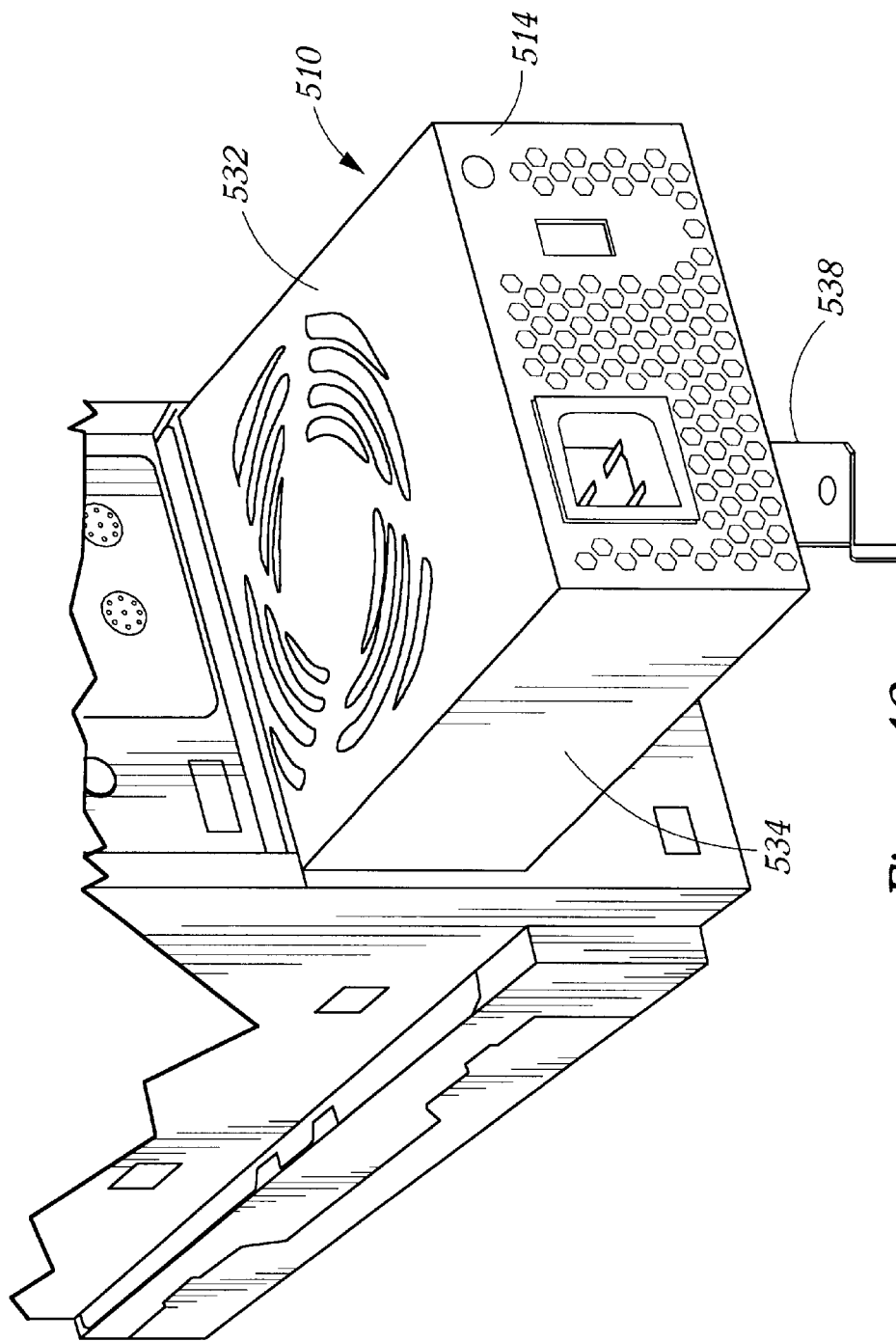
FIG. 13 is a detail, rear, right perspective view of a lower portion of computer housing with a power supply assembly in partially removed position.

Next as illustrated in FIG. 13 a person may grasp the protruding end of the modular power supply assembly 510 and pulls it rearwardly until it is fully removed from the power supply bay 570. As best shown in FIG. 14, the walls of the bay 570 may be provided with a plurality of longitudinally extending tongue portions 571, 573, etc. which are biased to a position slightly inwardly of the interior plane of the corresponding wall. The sizing of the modular power supply and the power supply bay and the friction force exerted by various tongue portions 571, 573, etc. is such that a moderate amount of rearward force must be applied, e.g., 5 lbs. to remove the modular power supply from the bay 570. An interior view of the power supply assembly 510 in a partially removed position is shown in FIG. 9. The power supply completely removed from the bay is illustrated in FIG. 14.

The time which it takes to move the power supply from the seated position shown in FIGS. 3 and 11 to the fully removed position in FIG. 14 is about 5 to 10 seconds. If a screw must be removed from the cam lever the total time required to remove the power supply by an average person with no technical experience who has recently performed the same operation at least once before, is approximately 20 to 30 seconds. Accordingly, the power supply assembly 510 is a "modular" component within the definition of "modular" provided above.

In order to return the modular power supply 510 to its operating position, cam lever 538 is returned to the position of FIGS. 3 and 11 with detent stud 548 received in detent hole 546. Thereafter, the modular 510 is inserted in bay access opening 572 and is pushed forwardly until reaching the seated position shown in FIGS. 3 and 11. In this seated position the high density power connector 526 is electrically connected with socket 580 and AC interlock 528 is engaged with AC interrupt actuator stud 590 causing electrical connection between the power supply and a power source connected thereto through a power cord (not shown) received in AC socket 518. If desired a screw (now shown) may be passed through hole 544 and screwed into hole 545 to positively hold the modular power supply assembly 510 in the seated position of FIG. 11.

It will be appreciated from the foregoing that by mounting both the electrical power components 564 and the power supply cooling fan 566 within a unitary power supply housing 512 which is automatically connected by pushing the power supply into a bay 570 and automatically disconnected by hand removal of the power supply from the bay that it is extremely easy for an operator to remove and inspect the power supply and/or replace a defective power supply with a new power supply if necessary. There are no computer components other than the power supply assembly itself which must be removed or disassembled in any way in order to remove the power supply assembly. Assuming that a person wishes to examine the power supply electrical components 564 or fan 566 it is necessary only to remove a pair of screws 531, etc. from the top face (which are received in bores 535, 537) and a pair of screws 539 from the rear face 524. In the illustrated embodiment the power supply top face 532, rear face 524, and lateral side faces 552, 554 are formed from a unitary piece of sheet metal which has been appropriately formed into the configuration illustrated in FIG. 16. The time it takes to remove the four screws to obtain access to the power supply components inside the power supply housing 512 is about 2 minutes or less. The housing 512 could, of course, be configured in any number of ways, as a routine matter in the sheet metal forming arts, including providing six separate faces having mating or screwably attachable mounting flanges, or providing compound assemblies having two or more faces which are constructed and arranged to be attached to corresponding portions of adjacent faces in order to provide a parallelepiped shaped housing 512. Even if the power supply housing 512 were not easily disassembled to access the internal components, there would still be a great advantage in having a power supply assembly which is easily removed and replaced. A computer user may thus easily return only the power assembly 512 rather than the entire computer for warranty or repair work. In this arrangement, the computer owner does not have to worry about third parties gaining unauthorized access to information on his/her drives and is not faced with the time and expense associated with packaging and shipping of the entire computer. Also, in the event that the entire computer 10 is returned to a warranty repair shop, a defective power supply assembly 510 may be quickly and easily replaced, possibly while the user waits, at a considerable labor cost savings to the warranty shop and/or to the user in the event of a non-warranty repair.

An advantage of the configuration of the modular power supply assembly 510 and the location of power supply bay 570 directly below motherboard bay 300 is that very effective cooling of both the power supply electrical components 564 and the motherboard assembly 350 is achieved by the air flow 592, FIG. 7, provided by the power supply fan 566 which may be, e.g., an axial flow fan such as Model No. AD0812MS sold by Adda of Taiwan and the CPU fan 376 which may be a radial flow air fan such as Model No. 50DC12V manufactured by Global Win of Taiwan. The flow path 592, as best illustrated in FIG. 7, is into the rear face 514 of the power supply housing 512, out the top face 532 of the power supply housing into motherboard bay 300 at a rear portion thereof, through the motherboard bay and out the vent holes 152, 154, etc. in top face 32 of the computer housing 12. (Alternatively, the fan direction may be reversed and the flow path may be through the vent holes 152, 154, etc. in the top side 32 of housing 12, through the motherboard bay 300, into the power supply housing through holes 534 in the top face 532, through the power supply fan and power supply housing and out the vent holes 516, 517, etc. in the rear face 514 of the power supply housing 512.) The air flow generated by either fan produces this general flow path and with both fans operating the airflow rate is of course increased. The operation of each of the fans may be conventionally controlled by a thermostat such that fan operation is provided only when the heat in the associated enclosure reaches a predetermined temperature.

Hard Drive Assembly

Figure 20:
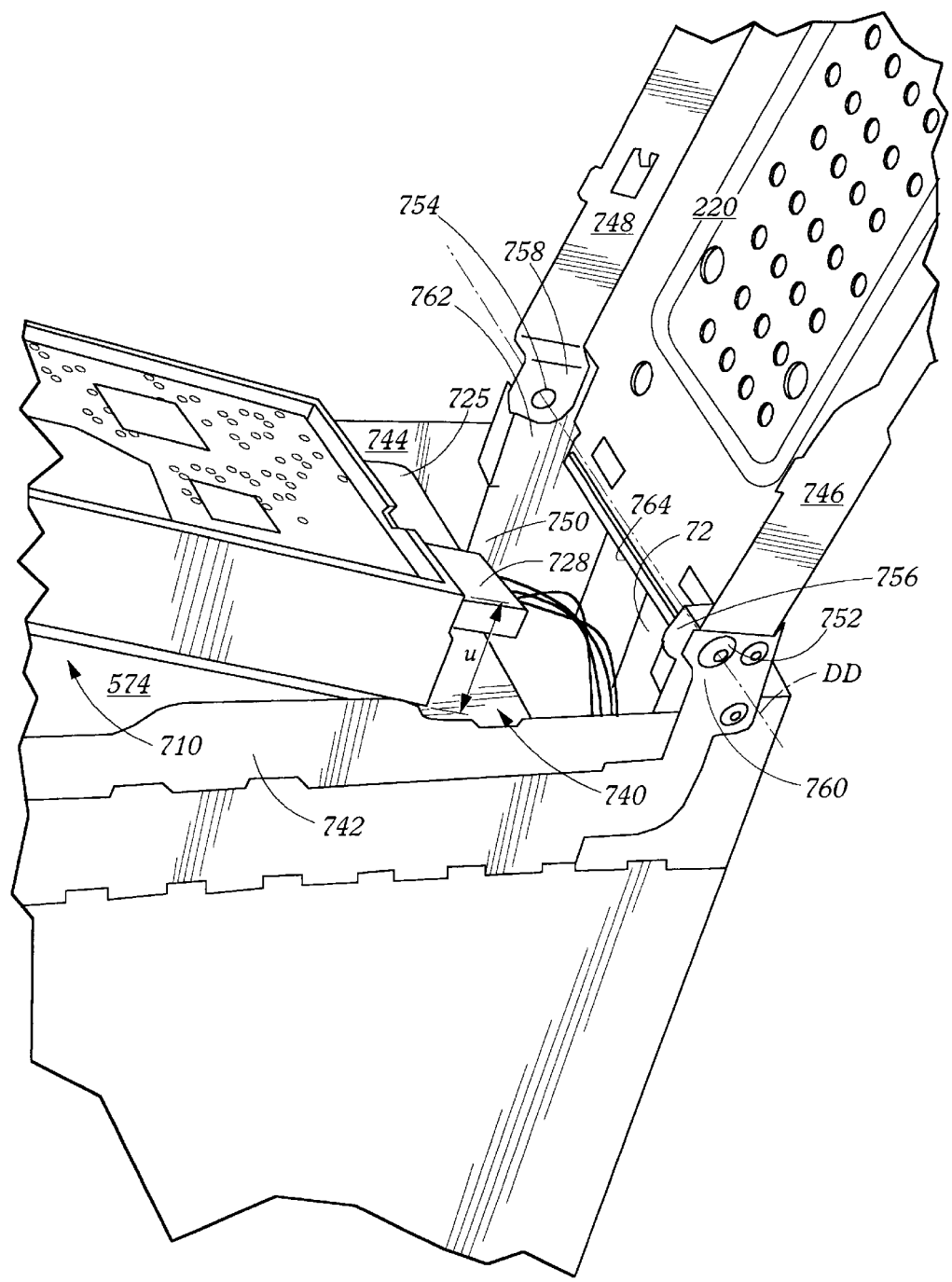
FIG. 20 is a bottom, right perspective view of a lower front portion of a computer housing with a hard drive bay door in an open position and with a hard drive assembly removed.
Figure 21:
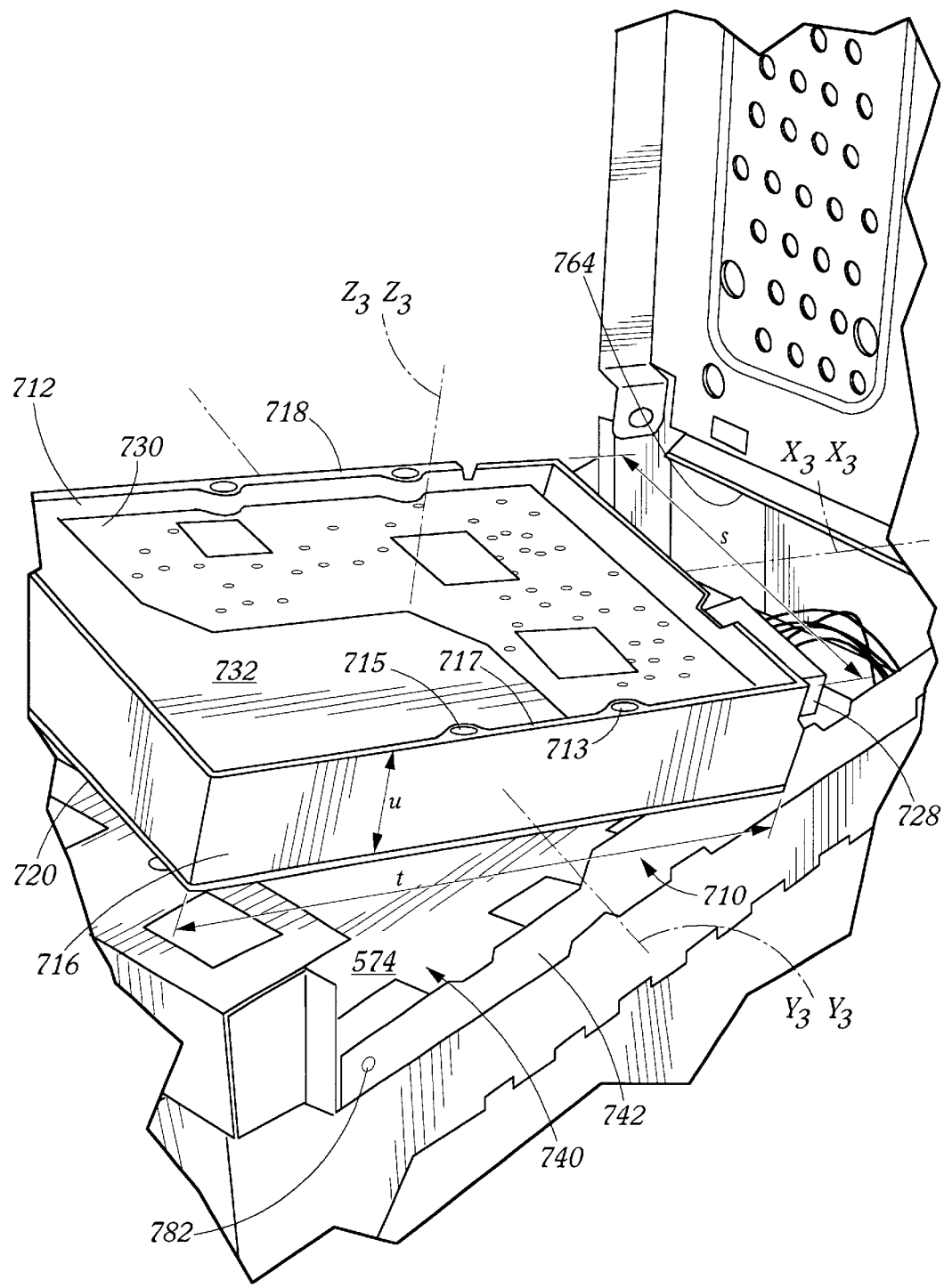
FIG. 21 is a bottom right perspective view of a lower front portion of a computer housing with a hard drive bay door in an open position and with a hard drive removed therefrom but still connected to electrical cables.
Figure 22:
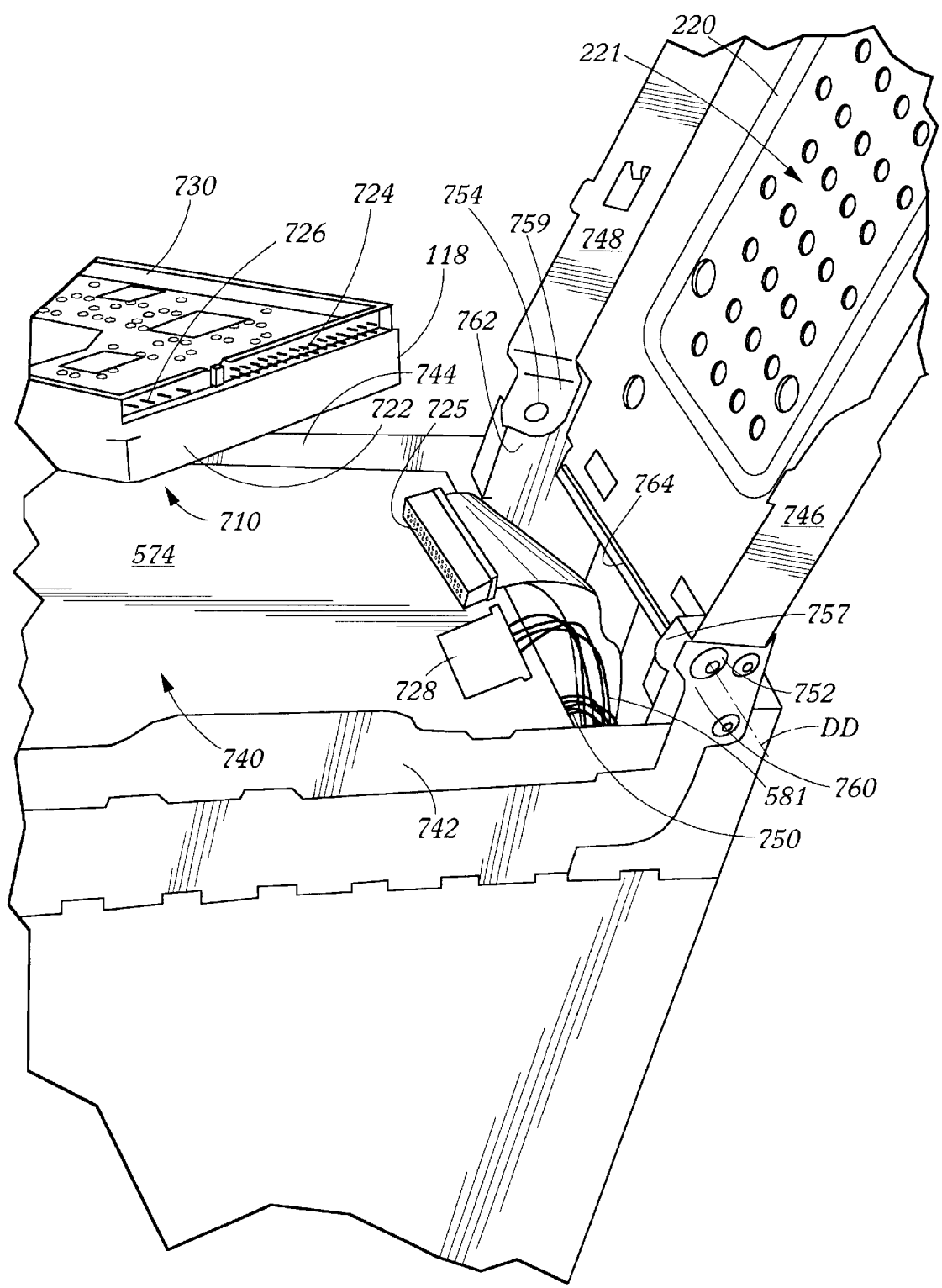
FIG. 22 is a bottom right perspective view of a lower front portion of a computer housing with a hard drive bay door in an open position and with a hard drive removed and completely disconnected from electrical cables.

A hard drive assembly 710 is mounted in a bottom hard drive bay 740 of computer housing 12. The bottom bay has a wall portion 220 which may be pivotally displaced about an axis DD to provide access to the hard drive as illustrated in FIGS. 5 and 18–22. As best shown in FIG. 21 the hard drive assembly 710 includes an open, generally rectangular top face portion 712 having threaded bores 713, 715 provided at one lateral edge 717 thereof. The drive assembly 710 has a generally rectangular bottom face 714, FIG. 18; a generally rectangular first lateral side face 716; a generally rectangular second lateral side face 718; a generally rectangular rear face 720 and a generally rectangular front face 722, FIGS. 21 and 22. The hard drive may have central intersecting longitudinal, lateral, and vertical axes $X_3X_3$, $Y_3Y_3$, and $Z_3 \; Z_3$. The hard drive assembly may have a longitudinally extending length "s" of 100 mm, a laterally extending width "t" of 145 mm and a vertical height "u" of 21 mm, FIG. 21. As best illustrated in FIGS. 20–22, front face 722 has a signal cable connector socket 724 adapted to receive hand connectable signal cable 725 and power cable connector socket 726 adapted to receive hand connectable power cable 728. The sockets 724 and 726 are electrically connected to components mounted on a drive circuit board 730 and encased hard drive 732 which are each mounted within the enclosure defined by the faces 714, 716, 718, 720 and 722.

Figure 18:
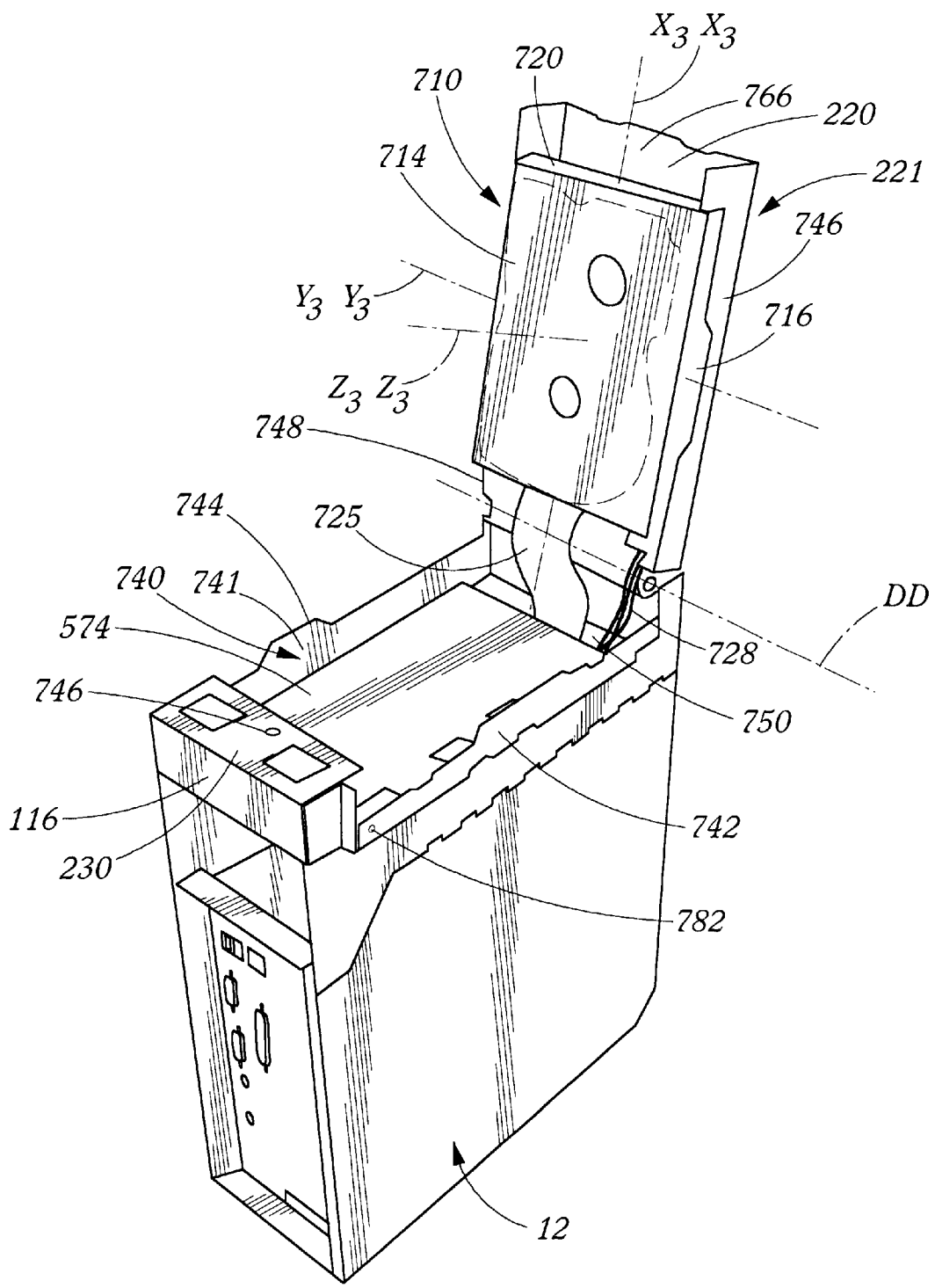
FIG. 18 is a bottom, right, rear perspective view of a computer housing having a hard drive bay door in an open position with a hard drive mounted in the door and with a power supply assembly removed.
Figure 19:
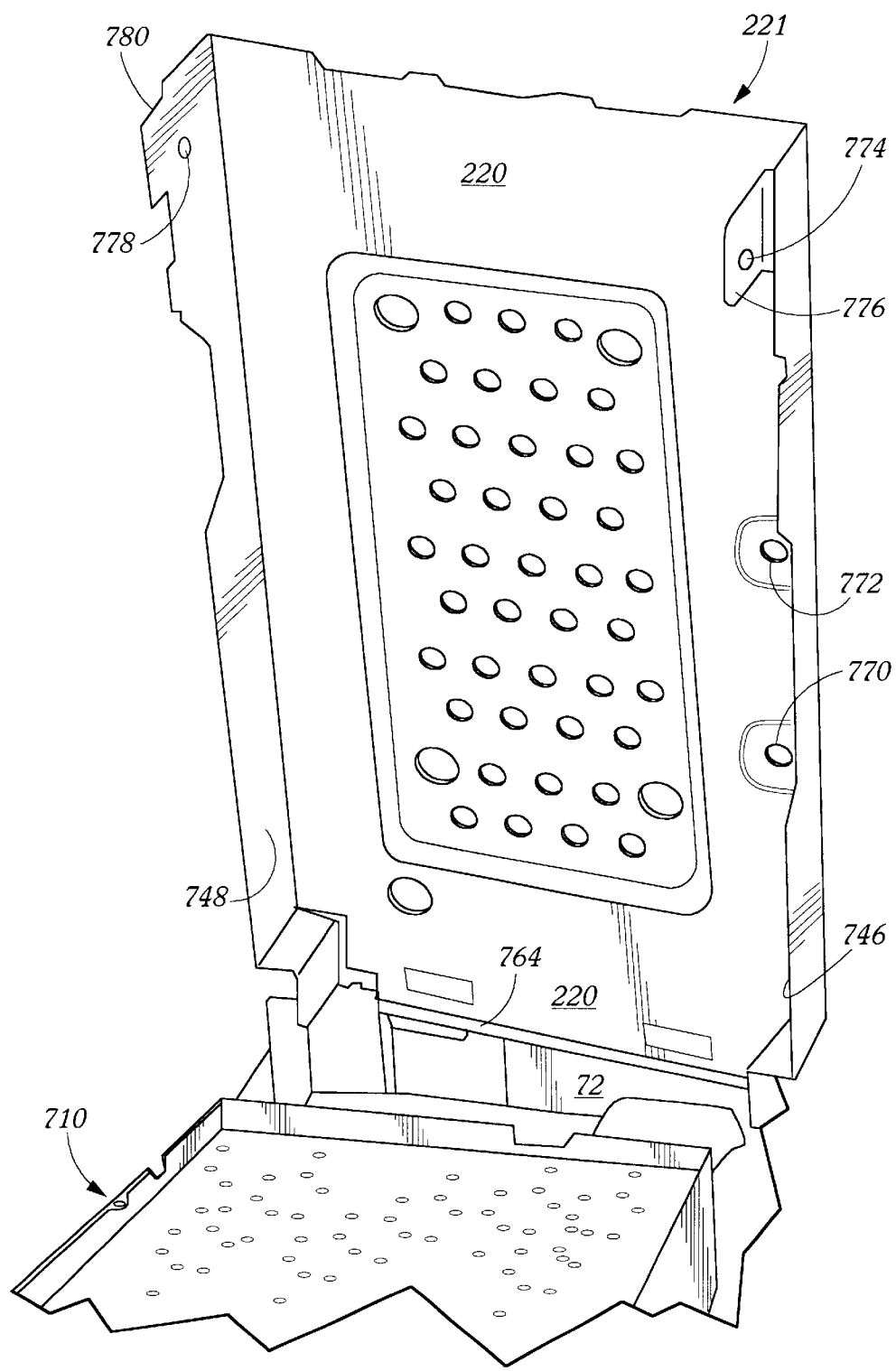
FIG. 19 is a detail rear perspective view of a hard drive bay door in an open position and with a hard drive assembly removed therefrom.

The hard drive bay 740 is provided in a bottom portion of the computer housing 12 and has a normally closed position, FIG. 5, and an open position, FIG. 18. The hard drive bay is defined by top wall 574 and bottom wall 220 which are positioned in parallel relationship when the hard drive bay is in the closed position. The bay is further defined by front wall recess portion 72, FIGS. 1 and 22; left side wall flange 742; right side wall flange 744; bottom wall left vertical flange 746 and bottom wall left vertical flange 748.

As further shown by FIG. 22, there is a front end vertical opening 750 formed by the termination of top wall 574 short of front wall portion 72, e.g., terminating approximately 70 mm short of wall 72, which provides access from the hard drive bay 740 to the forward chamber 581, enabling the signal and power cables 725, 728 to be extended through chamber 581 into the hard drive bay 740.

As best shown in FIGS. 20 and 22, a pair of pins 752, 754 extend through housing flange portions 760 and 762 and through recessed portions 757, 759 of bottom wall flanges 746, 748, respectively. Pins 752, 754 pivotally mount a bottom wall bay access door 221 about axis DD.

The bottom bay door 221 is comprised of bottom wall panel portion 220 and flanges 746, 748, etc. A bottom wall front edge portion 764 extends forward of the pivot axis and into an engaging relationship with bottom wall flange portion 73 when door 220 is closed, FIG. 5. A bore 766 in door 220 is adapted to receive a screw 238 therethrough which may in turn be threaded into bore 768 in the housing fixed bottom wall portion 230 to positively secure the pivotally displaceable bottom wall door 221 to fixed bottom wall portion 230. The hard drive assembly 710 is removably affixed to the pivotal door 220 as by screws 244, 246, FIG. 5 received through bores 770, 772, FIG. 19, in the door 221 which are in turn threaded through bores 713, 715 in the hard drive assembly, FIG. 21, so as to mount the hard drive in the door 221 as illustrated in FIG. 18.

In addition the positive retention of door 221 in a closed position by screw 238, further devices for holding the door in the closed position may be provided, for example, a detent boss 774 may be provided in flange 776 and a detent boss 778 may be provided in flange 780. The detent bosses co-act with bore holes 782 (only one shown) in flanges 742 and 744 respectively.

FIG. 5 illustrates door 220 in its closed position with hard drive assembly 710 mounted in an operating position within hard drive bay 740. In order to access the hard drive, initially door retaining screw 238 is removed with a conventional screw driver 239. Next the door 220 is swung open about pivot access DD to the position shown in FIG. 18. Next, screws 244, 246 are removed enabling the hard drive assembly 710 to be removed from door 220 and supported on surface 574, FIGS. 19 and 20. Next, as illustrated in FIG. 21 the signal cable 725 and power cable 728 are hand removed from the corresponding sockets 724, 726. The hard drive may now be completely removed from the computer 10, FIG. 22. It is to be understood that the removal may also be performed in an altered sequence. For example the screws 244, 246 might be removed before screw 238, or the cables might be taken off before removing screws 244, 246. The total time required to remove the hard drive assembly 710 from the computer 10, starting from the operating position shown in FIG. 5, by an average person with no technical experience who has recently performed the same operation at least once before, is less than three minutes. Accordingly, the hard drive assembly 710 is a "modular" component within the definition of "modular" provided above.

A hard drive may be remounted in the computer by performing the above described removal process in reverse. The time that it takes to remount the hard drive is generally comparable to the time that it takes to remove the hard drive, less than three minutes.

It will be appreciated that providing a computer with a modular hard drive assembly 710 such as described above provides many benefits to both a user and to a computer service department. For example, if a user desires to have work performed on a defective hard drive he/she can easily remove it and ship it to a repair site without going through the considerable trouble of packing and shipping the entire computer. Furthermore, the individual may be able to continue using his computer without the hard drive if he has other drives which have a copy of the computer operating system. Another benefit is that a computer operator who requires service to another portion of his computer may remove and retain the hard drive before shipping the computer and thus retain control over the hard drive and possibly sensitive data contained thereon. Also, a user may use the removable hard drive in the same manner that a computer user uses removable media. For example, in a computer which is shared by multiple users, each user might own and retain his or her individual hard drive which he/she manually installs at the beginning of an operating session. A removable hard drive is, of course, a great benefit to a repair shop which may easily replace a defective hard drive for the user, possibly while the user waits. The easily removable hard drive reduces labor time associated with hard drive repair or warranty service and thus is beneficial to the computer servicer as well as the computer user.

Thus it will be seen that a computer 10 may be provided which is very compact and occupies a relatively small "footprint" on a desk top. For example, the embodiment of the housing specifically described above has a total volume of less than 7143 cm$^3$. However the manner in which components are mounted in the computer allows easy access to the various components of the computer, even in this relatively compact configuration. The removable media drive, hard drive, and power supply are each modular components allowing easy removal and replacement/repair/inspection of these components. This modular construction also enables the computer motherboard assembly to be readily-accessible for maintenance and repair or upgrading.

Exterior Casing

As mentioned briefly above, the computer 10 may be provided with an exterior casing 270 which may be constructed from ABS plastic or other high strength material. The casing 270 provides an aesthetically pleasing appearance and also provides a stable base for the computer. The base is sufficiently wide so that the computer may be tipped approximately 20 degrees from a vertically upright position to either the left or right before passing its balance point, i.e., before passing a point where it will fall over rather than return to a vertical position if released.

Figure 24:
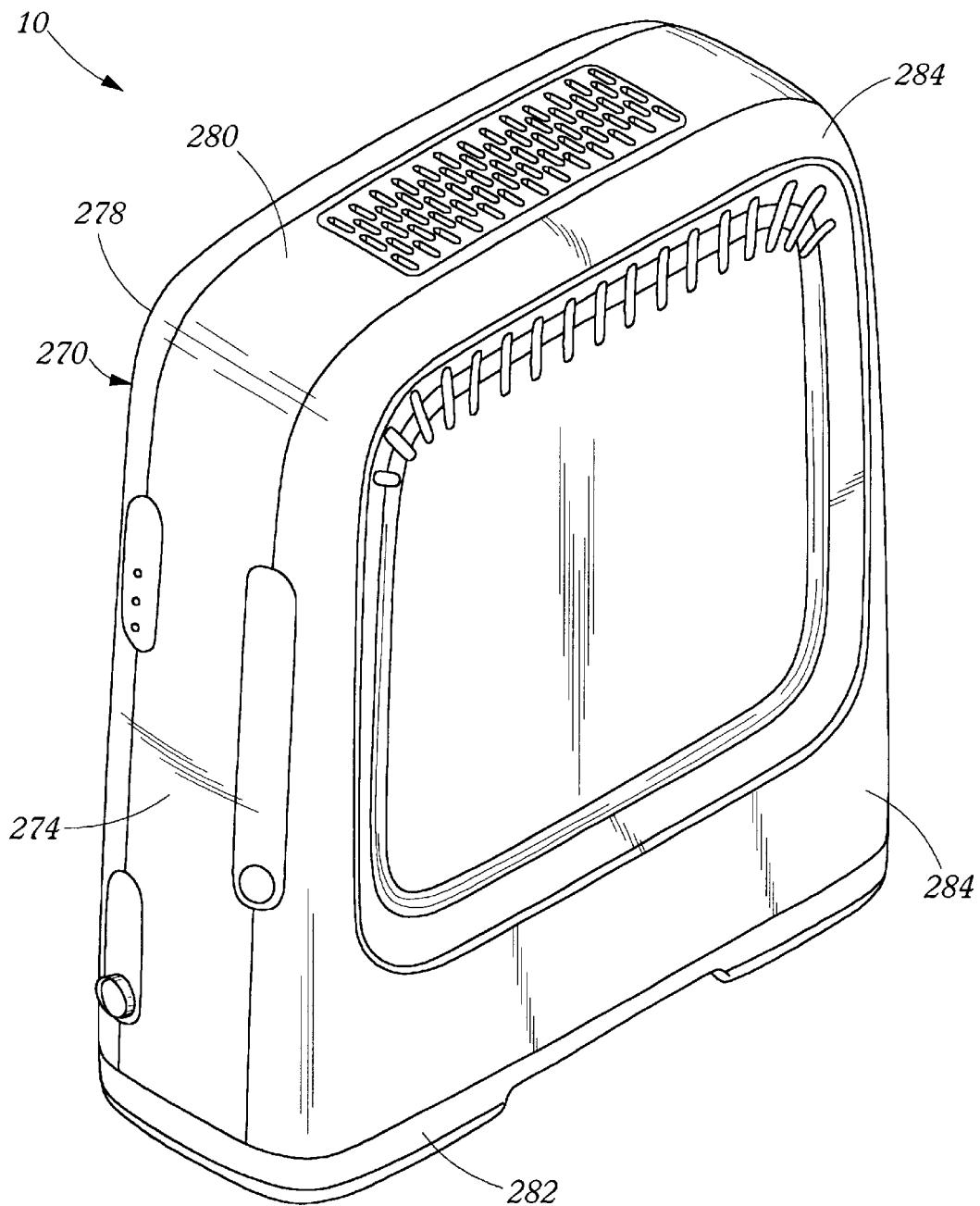
FIG. 24 is a perspective view of the tower computer.
Figure 25:
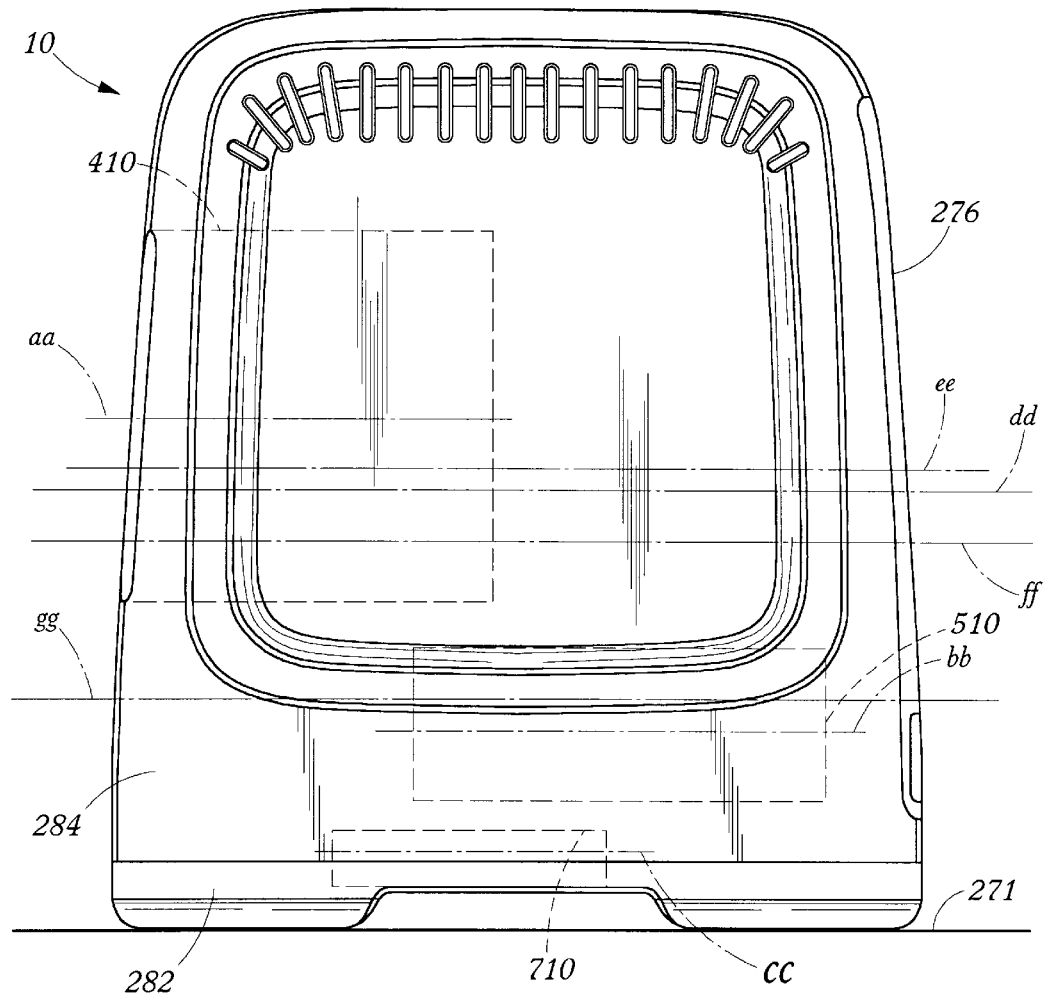
FIG. 25 is a right side elevation view of the computer of FIG. 24.
Figure 26:
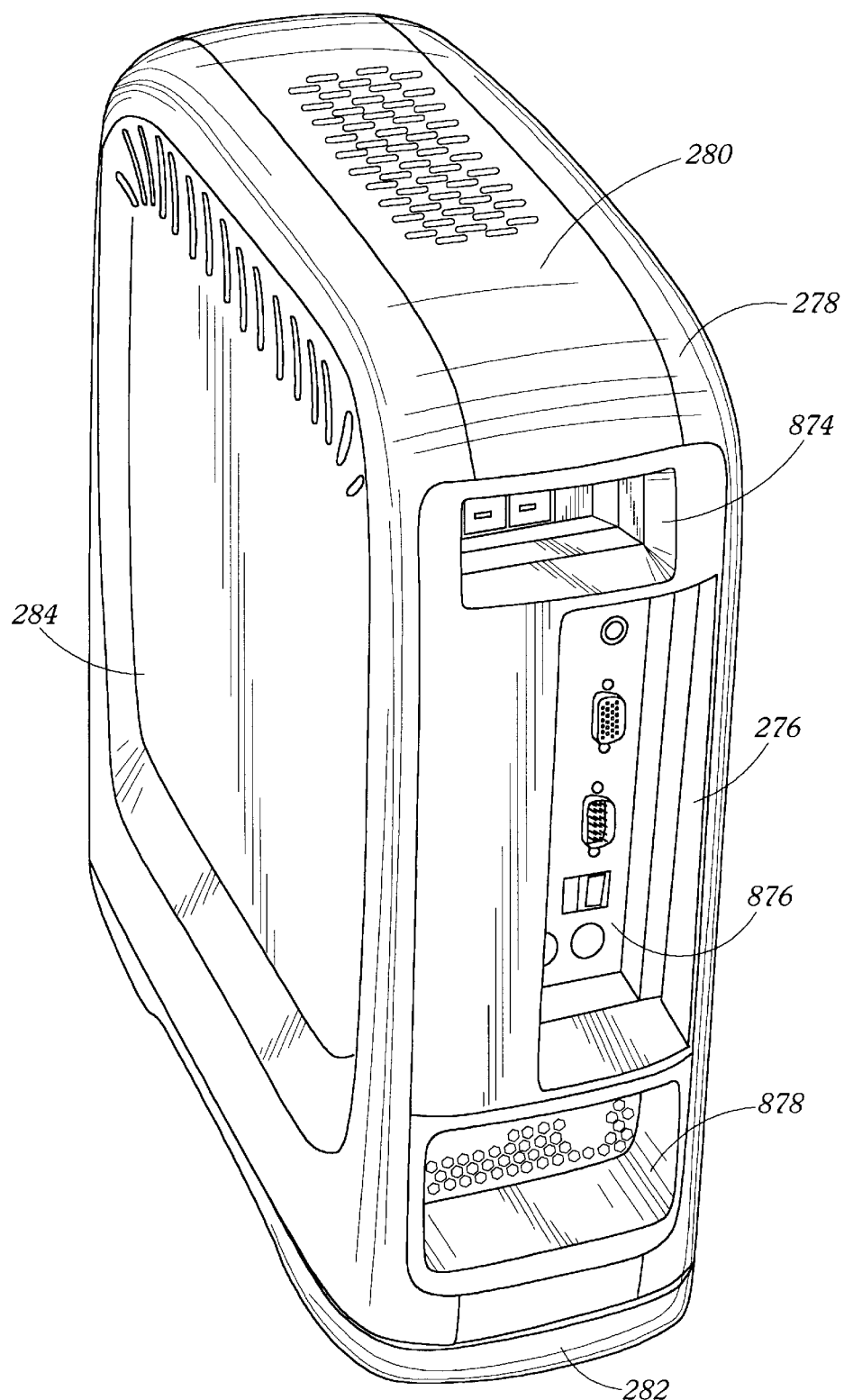
FIG. 26 is a rear perspective view of the computer of FIG. 24.
Figure 27:
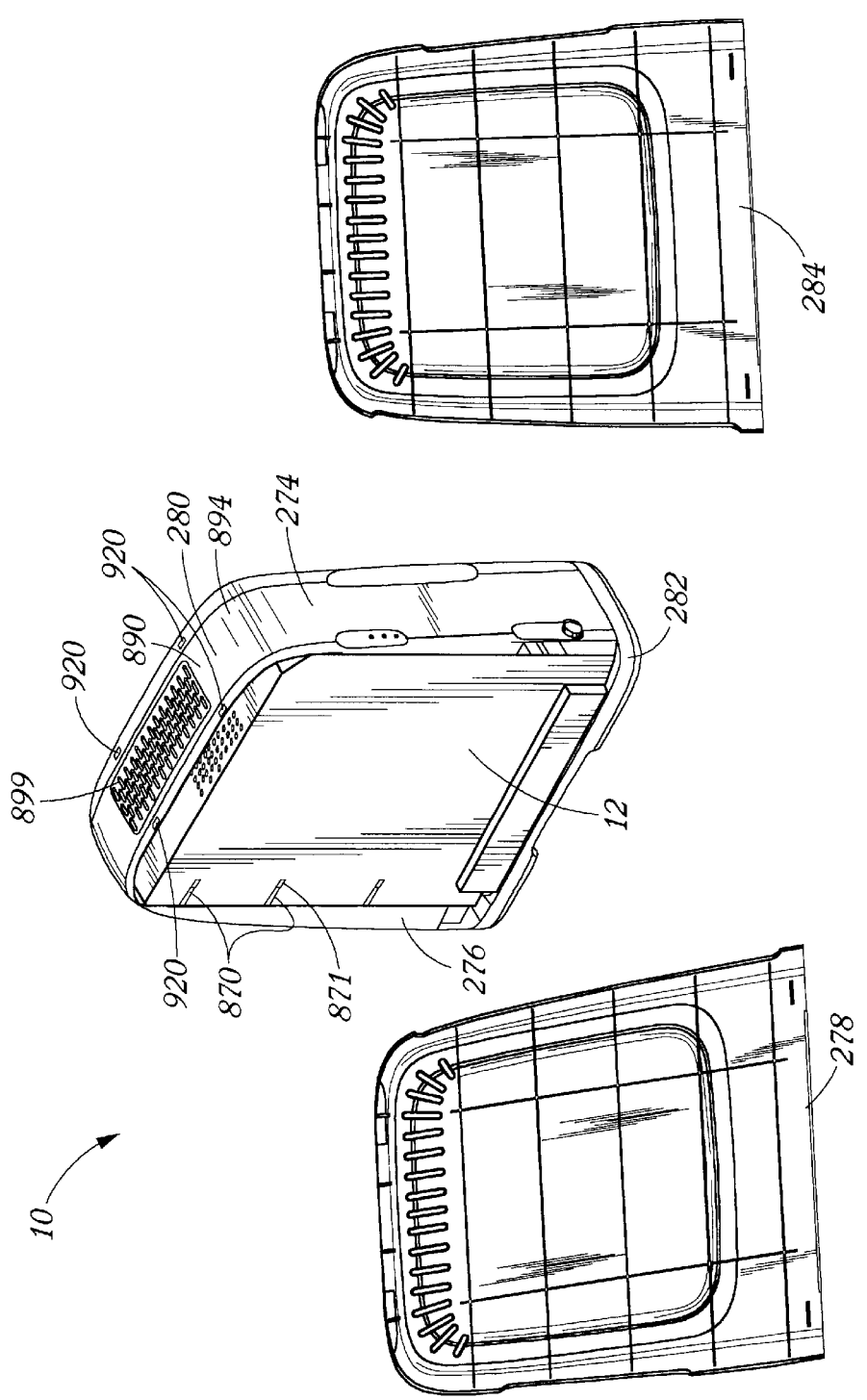
FIG. 27 is a partially exploded front perspective view of the computer of FIG. 24.

An exploded view of the casing 270 is shown in FIG. 23 and an assembled view of the casing is shown in FIGS. 23 and 27. A completely assembled casing mounted on computer 10 is illustrated in FIGS. 24 through 26. As previously mentioned the casing has a front portion 274 a rear portion 276, a left side panel 278, a top portion 280, a bottom portion or base 282 and a right side panel 284.

Figure 29:
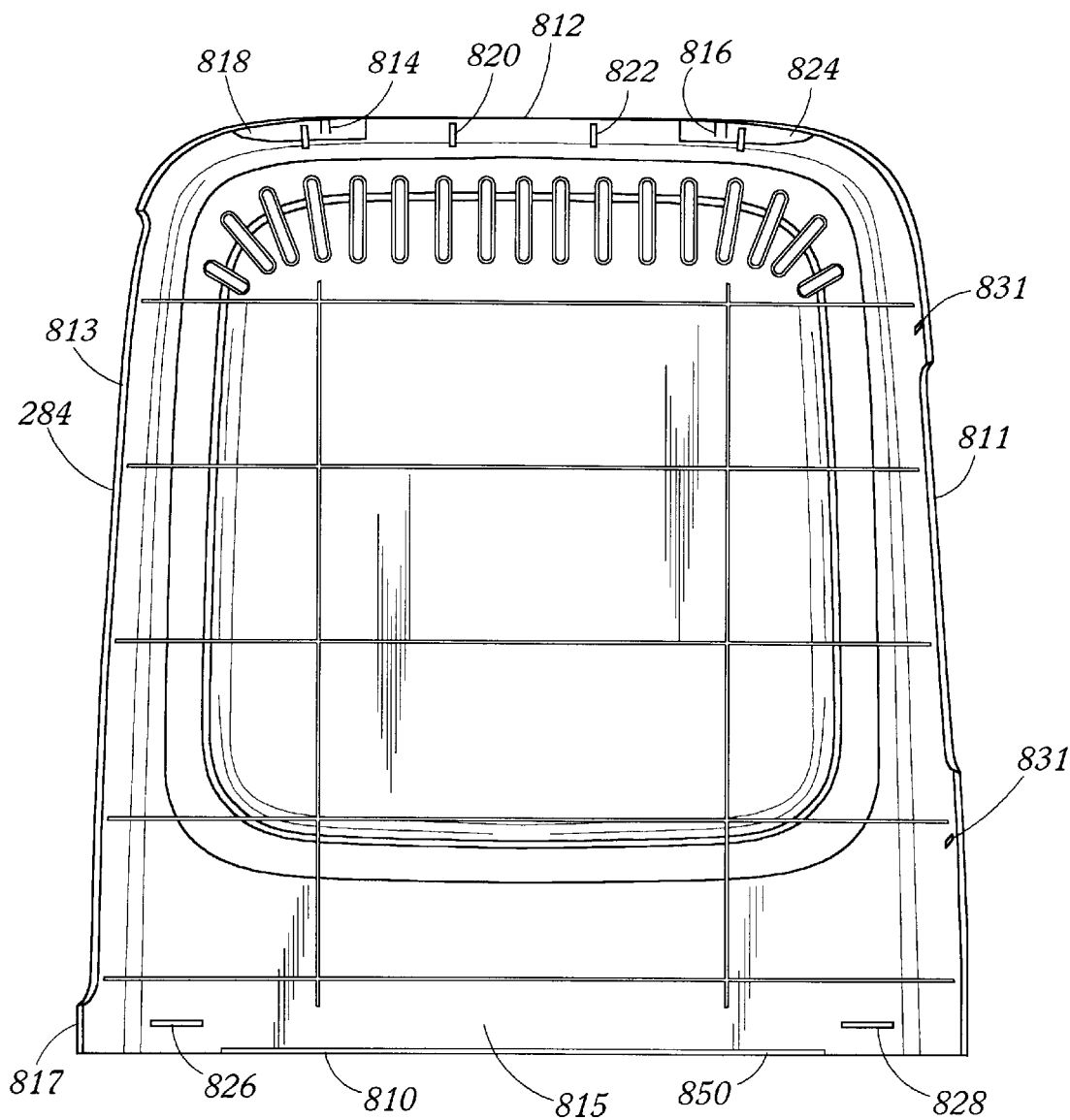
FIG. 29 is an interior elevation of a computer casing side panel.

The right side panel 284 has a bottom edge 810, a top edge 812, a front edge 811 and a rear edge 813 which are adapted to engage corresponding edges of other casing portions. The panel 284 has an inside surface 815 and an outside surface 817. Upper most projections 814, 816 are provided on the inside surface 815 near the top edge 812 of the panel. Upper step-shaped projections 818, 820, 822, 824 are provided in staggered relationship with projections 814, 816 and spaced slightly below those projections. The projections 814, 816, 818, 820, 822, 824 facilitate a mounting the panel member 284 on other portions of the casing 270 as will be described in further detail below. Bottom tabs 826, 828 are positioned on the inside surface 815 at lower corner portions of the panel as best shown in the FIG. 29.

Figure 30:
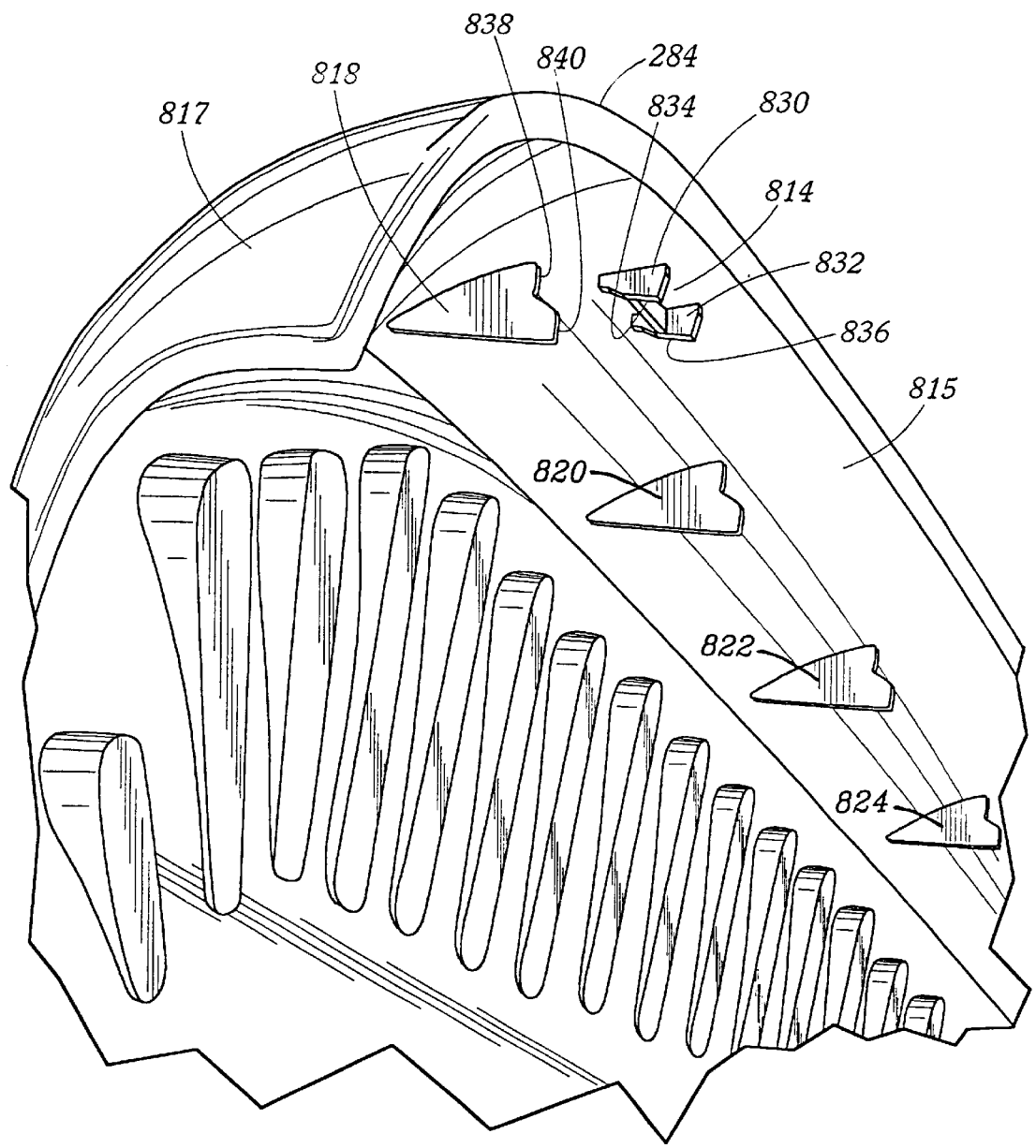
FIG. 30 is a detail perspective view of an upper corner portion of the panel of FIG. 29.

As best shown in FIG. 30 each projection 814, 816 has downwardly extending side projections 830, 832 which have generally horizontally extending lower edges 834, 836. Each of the projections 818, 820, 822, 824 is generally stair step shaped and has a generally vertically extending edge portion 838 and a generally horizontally, slightly downwardly sloping edge portion 840.

Figure 31:
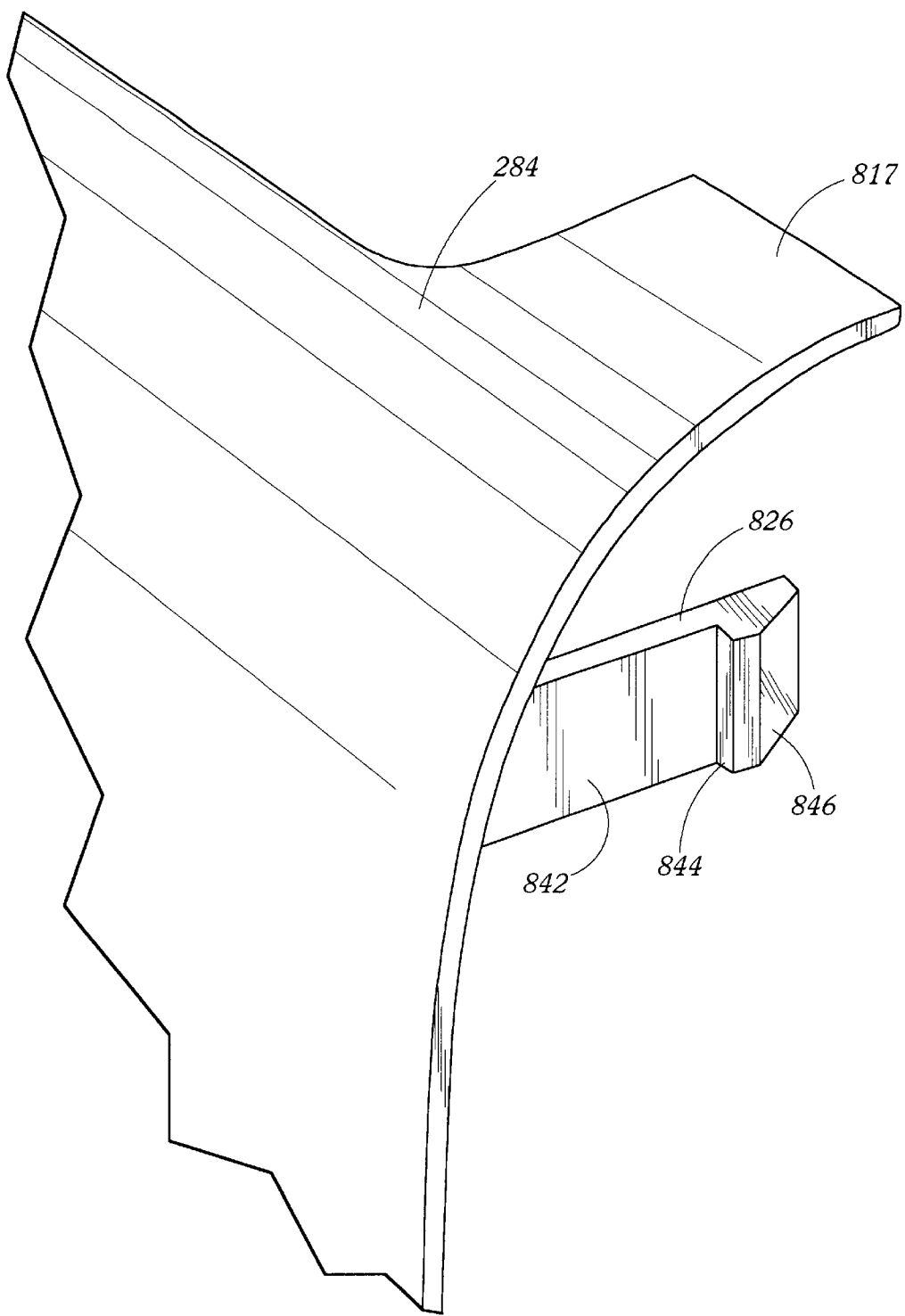
FIG. 31 is a detail perspective view, taken from the outside, of a lower corner portion of the panel of FIG. 29.

As best shown in FIG. 31 each bottom tab 826, 828 has a generally horizontally extending bottom surface portion 842, a generally vertically extending portion 844 and an upwardly and outwardly sloping beveled surface portion 846.

A recessed surface 850 is provided along the bottom inside edge of the panel 284 which is adapted to mate with an inversely shaped recessed surface on the casing base 282.

The left panel 278 is substantially a mirror image of the right panel 284 except for certain cut out portions therein.

Figure 32:
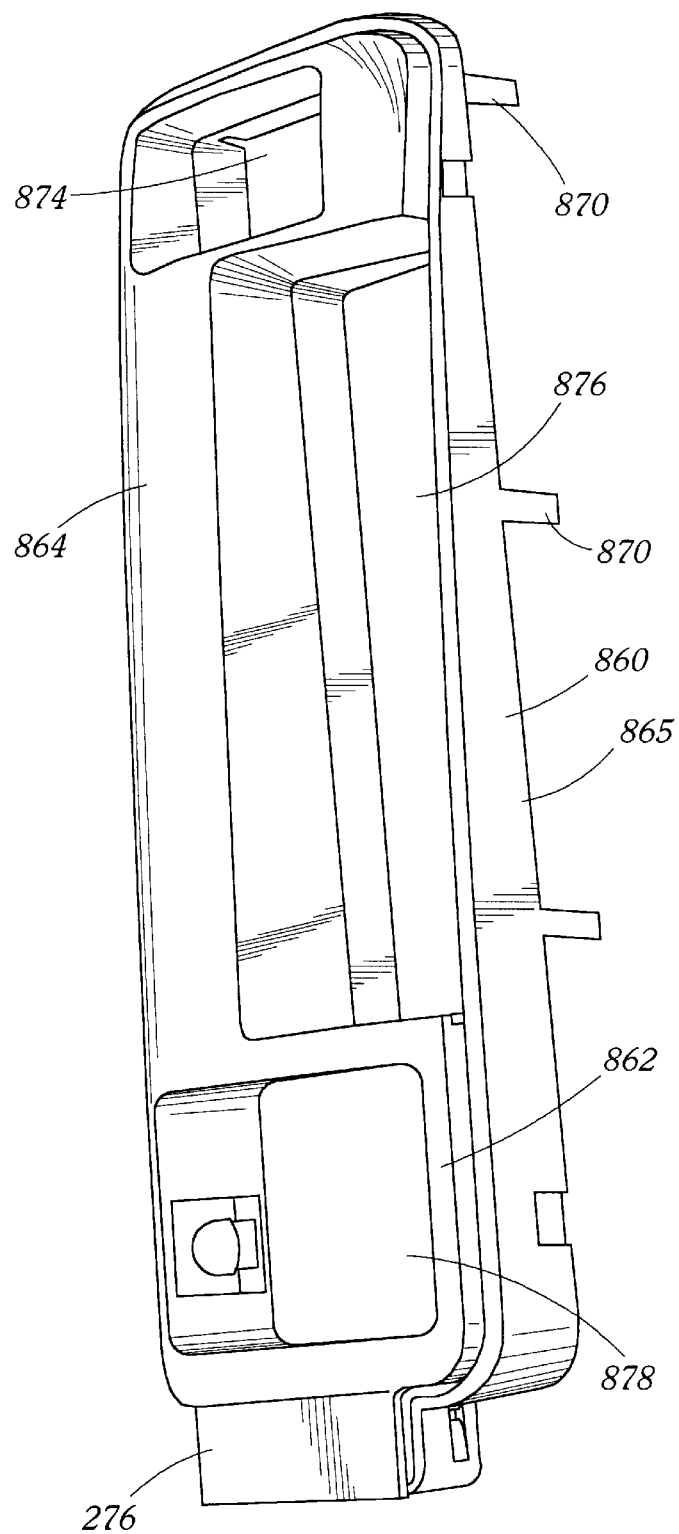
FIG. 32 is a front perspective view of a rear portion of a computer casing member.
Figure 33:
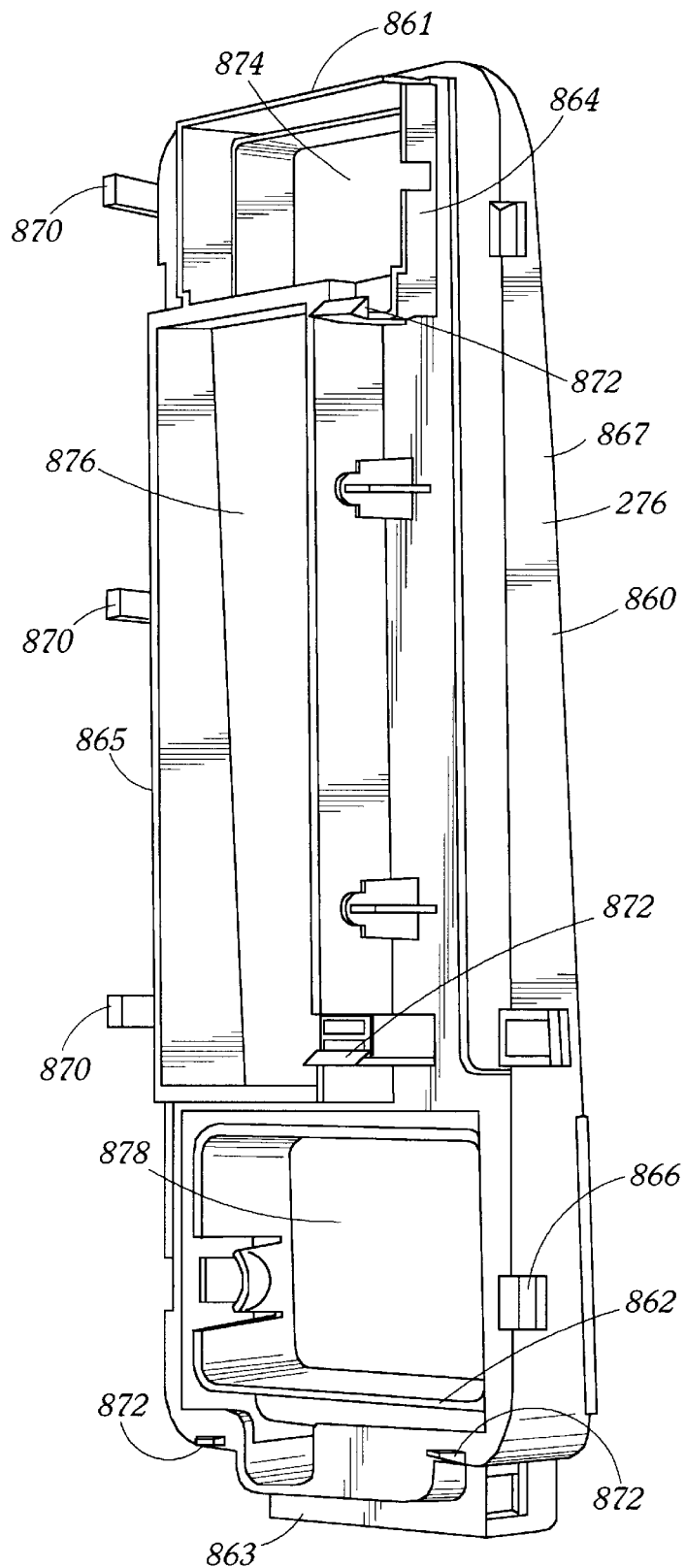
FIG. 33 is a rear perspective view of the casing member of FIG. 32.

The rear portion 276 of the casing 270 is a compound member as illustrated in FIGS. 32 and 33. The compound member includes an outer frame member 860 having a top edge 861 a bottom edge 863 a left side wall 865 and a right side wall 867. The outer member has a lower insert member 862 and an upper insert member 864 fixedly mounted therein as by connector tabs 866, 868, etc. The compound member includes peripheral tabs 870 which engage sheet metal housing side wall indentions 871, FIG. 27. The compound rear member 276 also includes insert tabs 872 adapted to be received through holes in the housing to provide a snap-fit lock once they have been inserted. The compound member 276 includes openings 874, 876, 878 therein adapted to expose various I/O ports, etc. as best shown in FIG. 26.

Figure 28:
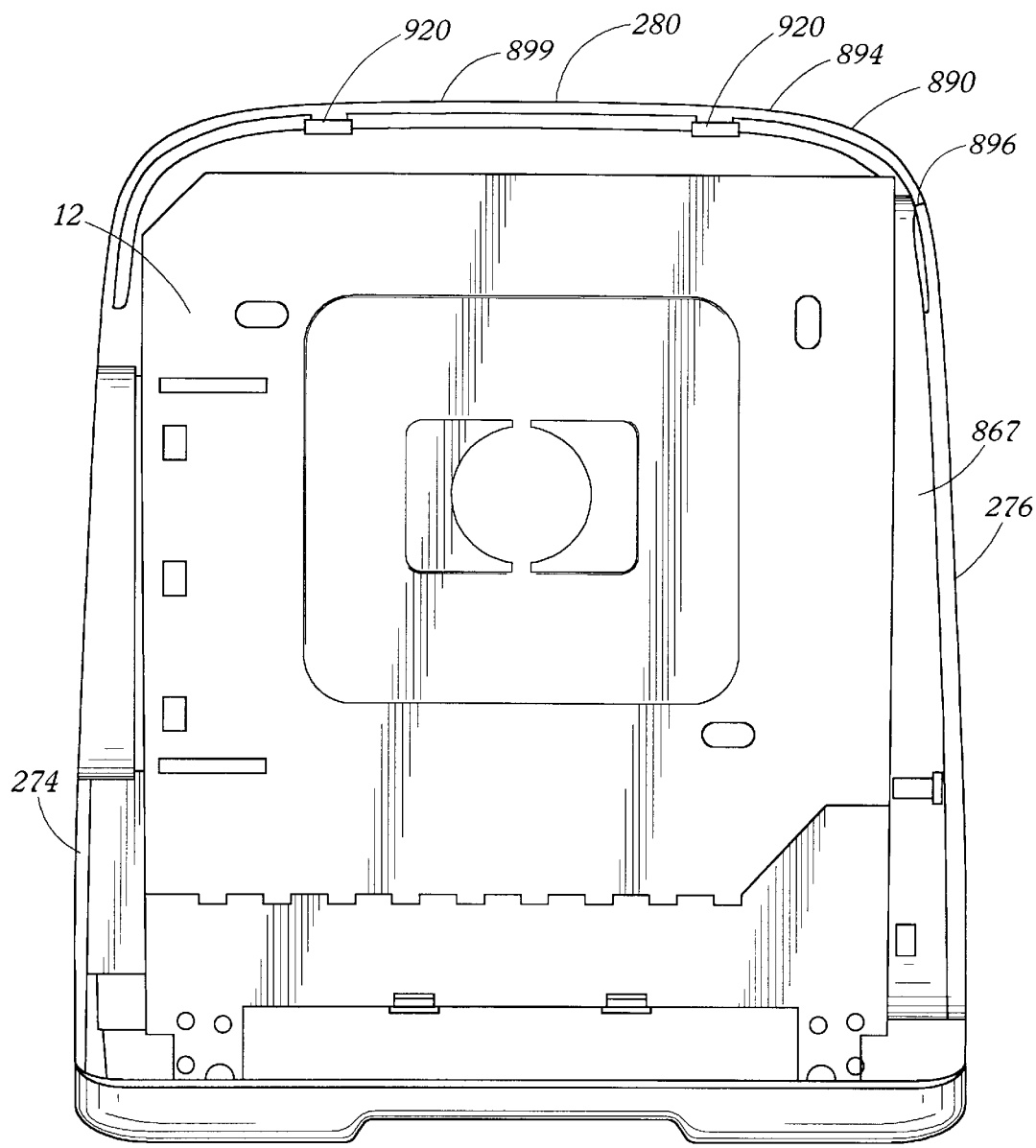
FIG. 28 is a right side elevation view of a computer as shown in FIG. 27 with side panels removed.
Figure 34:
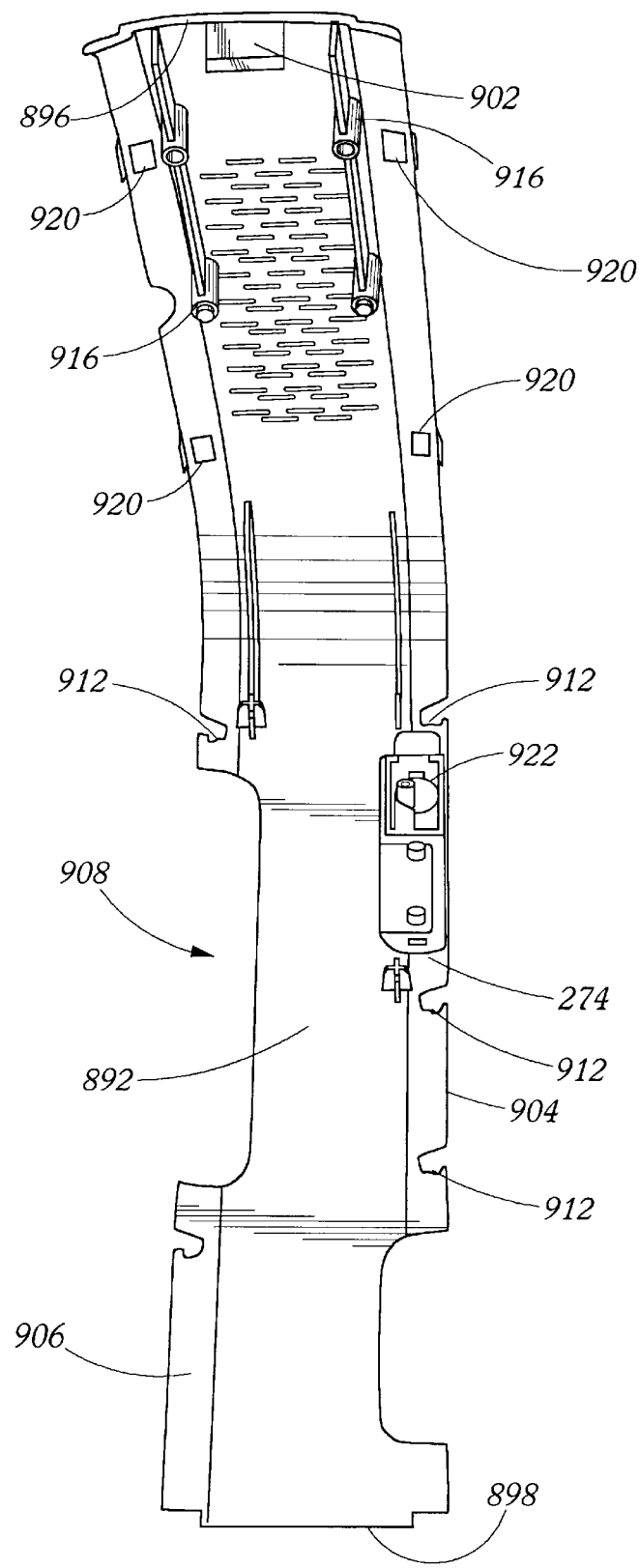
FIG. 34 is a interior perspective view of an integral top and front casing member.

As best shown in FIG. 34 the top and front portions 280, 274 of the casing 270 may comprise an integral member 890 having an inside surface 892, an outside surface 894, FIGS. 27 and 28, a rear edge 896, a bottom edge 898 and a top surface 899 having a plurality of vent holes 900 therein. A rear edge latch portion 902 is adapted to latch onto an upper edge 861 of compound member 276 described above. The integral piece 890 further includes left and right edges 904, 906 having large cutouts 908, 910 located there along to enable access to certain portions of the computer. There are also small downwardly sloping cutouts 912 adapted to receive projections 831 of associated side panel members. A bottom tab 914 has a catch surface thereon adapted to snap onto an outwardly projecting bracket mounted at the base of the sheet metal housing 12 to secure the integral piece 890 thereto. Spacers 916 are adapted to space the upper portion of the integral piece 890 from the upper portion of the housing 12. Four cutouts 920 at the top lateral edges of member 890 are adapted to receive projections 814, 816, etc. of the left and right side panel 278, 284. A push button assembly 922 is mounted at an upper portion of the integral member 890.

Figure 35:
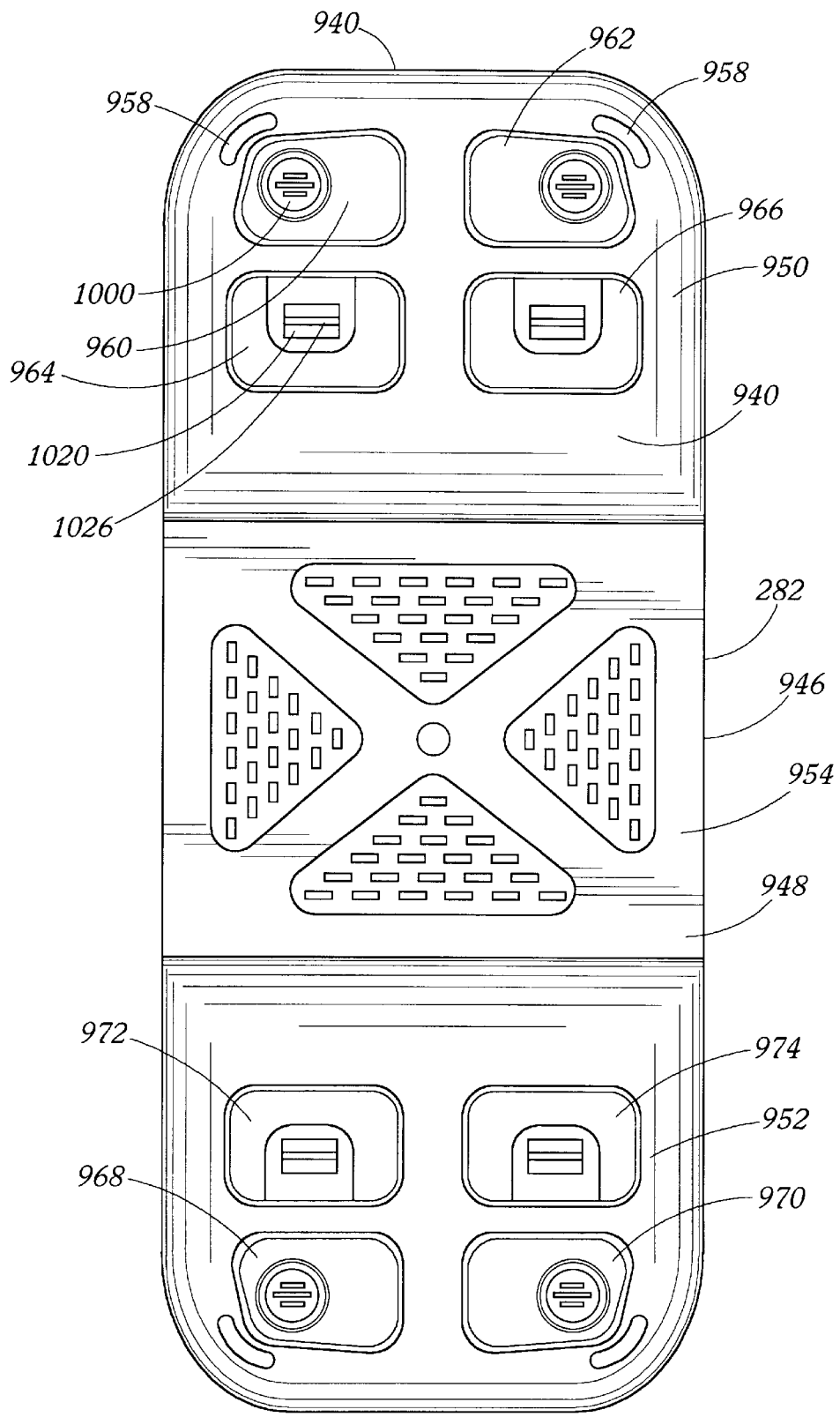
FIG. 35 is a bottom plan view of a casing base member.
Figure 36:
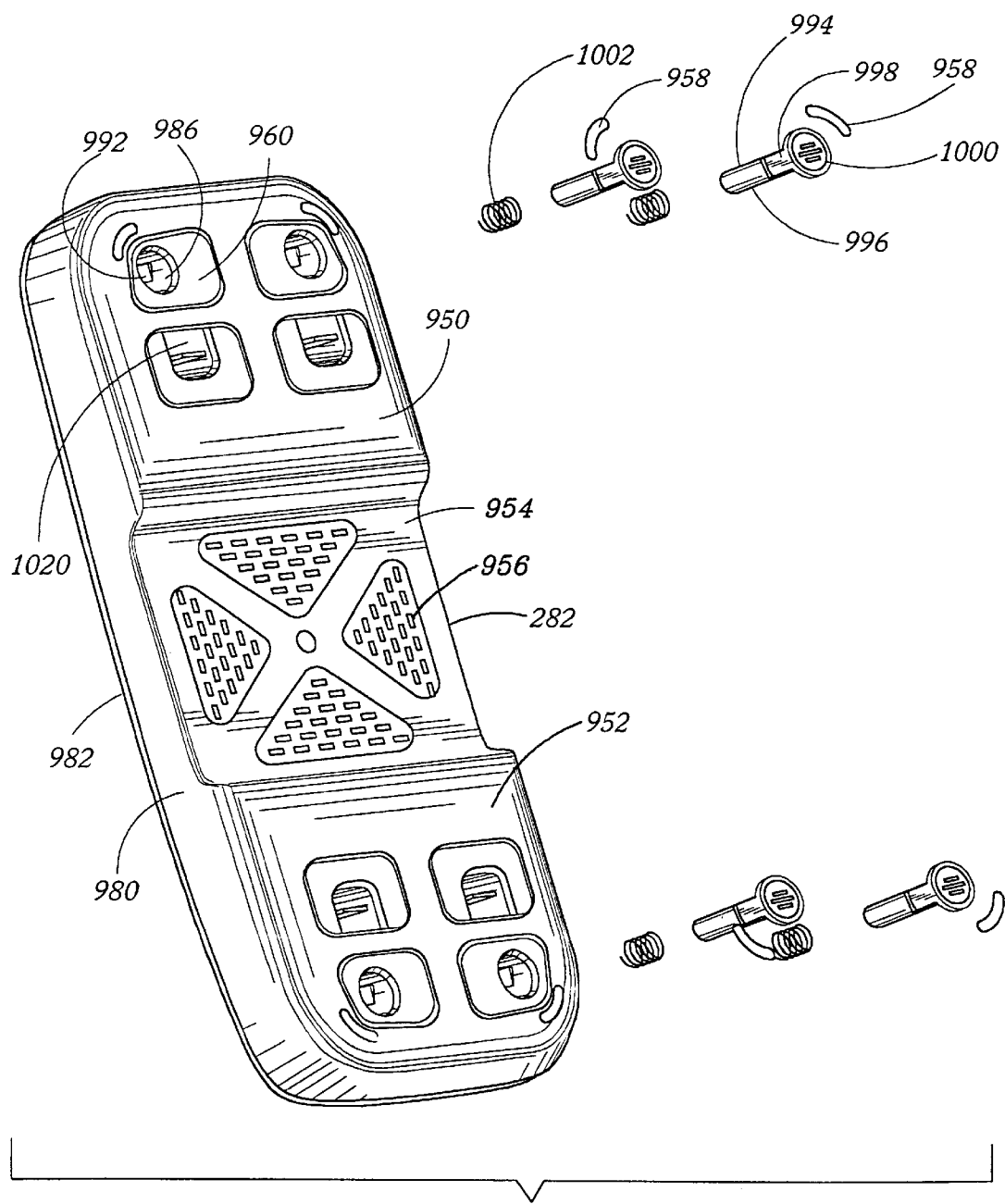
FIG. 36 is a bottom exploded perspective view of the base member of FIG. 35.
Figure 37:
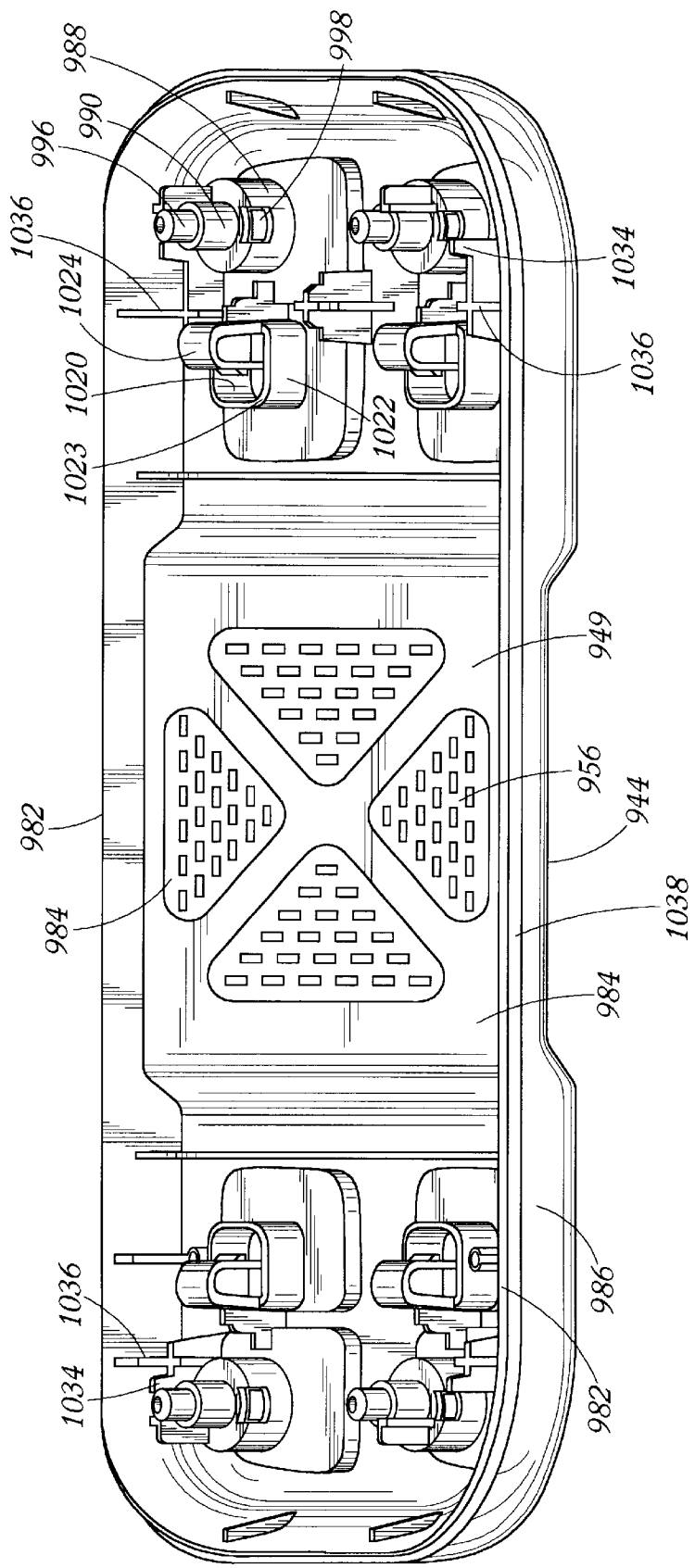
FIG. 37 is a top perspective view of the base member of FIG. 35.

As best shown in FIGS. 35–37, base member 282 has a generally dished out configuration with a rear edge 940, a front edge 942, a right edge 944 and a left edge 946. Base member 282 has a bottom surface 948 and a top surface 949. The base member has identical end portions 950, 952 separated by a raised center portion 954 having vent holes 956 therein. The bottom surface, FIGS. 35 and 36, has four base foot inserts 958, constructed from relatively skid resistant plastic material, provided therein. The end portions 950, 952 at the bottom surface thereof comprise a plurality of recessed surfaces 960, 962, 964, 966, 968, 970, 972, 974. The lateral side surface 980 of the base member extends generally vertically around the entire periphery of the base member but transitions into the horizontal base through a relatively large radius transition in the end portions 950, 952. The base member includes a top edge 982 and an interior surface 984 including both horizontal and vertically extending portions.

The base member 282 has a recessed portion 1038 provided at its top lateral side wall which is adapted abut the similar shaped recessed surface 850 provided at the bottom inside portion of each side panel 278, 284.

Figure 38:
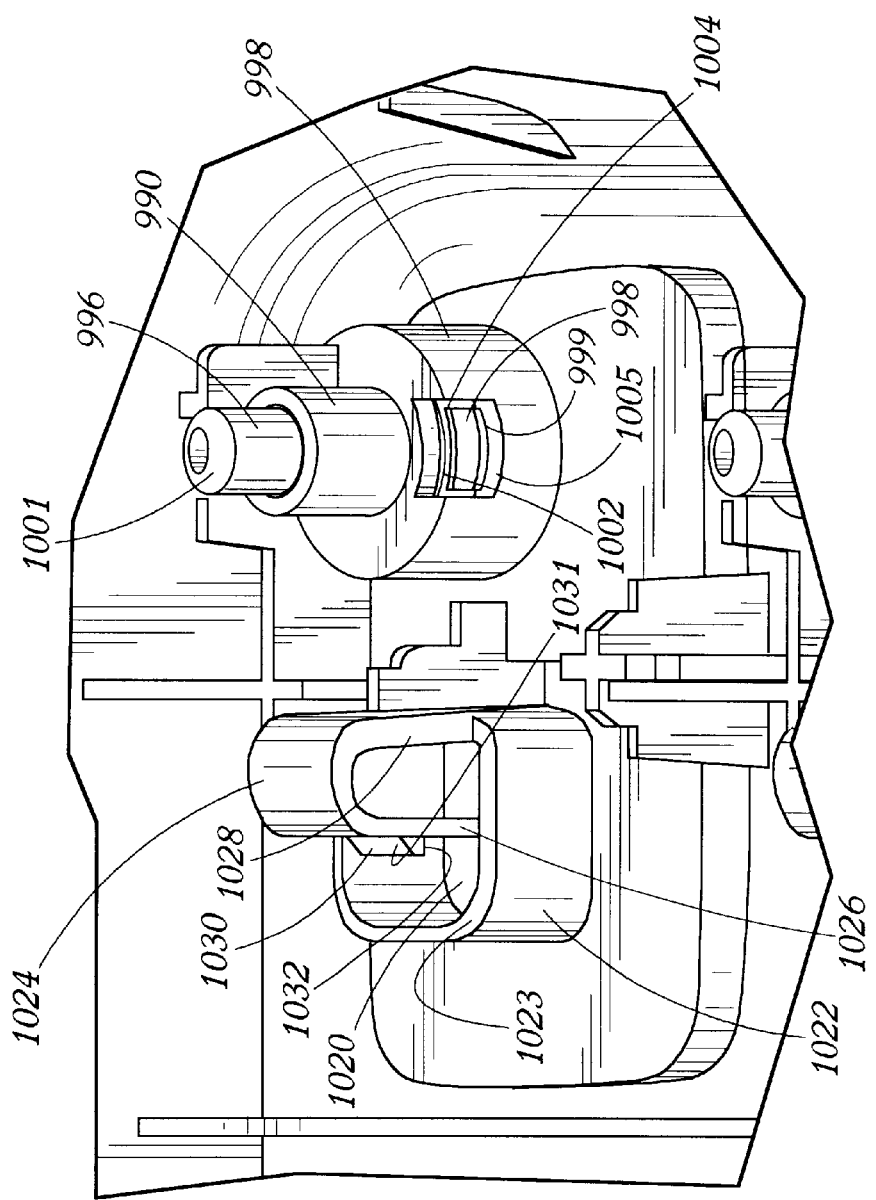
FIG. 38 is a detail top perspective view of a corner portion of the base member FIG. 37.

Recessed portion 960, 962, 968, 970 each have a further recess 986 provided therein which is defined by a relatively large diameter cylindrical projection 988. That cylindrical projection 988 in turn has a small cylindrical projection 990, FIG. 38 extending upwardly there from. The small cylindrical projection has a hole 992 in the center thereof for receiving a plunger member 994 which acts as a push button as described below. Each plunger member 994 includes a cylindrical shaft 996 and an axial lock member 998 having an axially extending, radially outwardly biased and inwardly deflectable projection with a stepped surface 999 and a beveled outer end. The plunger members also each comprise an enlarge push button end portion 1000 at one end thereof. The end of the shaft 1001 opposite from the button portion 1000 is the same diameter as the shaft. A coil spring member 1002 is adapted to encircle the shaft and push against the button end portion 1000 to bias the plunger member 994 in a button downward direction once the plunger has been installed in the base. A slot 1004 provided in the side of the large cylindrical projection is adapted to receive projection 998 therethrough in a snap fit relationship such that surface 999 of the projection prevents the plunger member 994 from moving axially downwardly beyond the point where the surface 999 abuttingly engages the base 1005 of slot 1004. Thus, the plunger member is mounted on the base by first mounting spring member 1002 about shaft 996 then inserting shaft 996 through hole 992 with projection 998 aligned with slot 1004 in cylinder projection 988. The plunger member is then pushed upwardly through the hole until projection 998 snaps outwardly. Thereafter, the spring pushes against the recessed horizontally extending surface of the large cylinder 988 at one end and against the upper surface of the button end portion 1000 at the other end, biasing the plunger member in the position shown in FIG. 38. In this position as illustrated in FIG. 35 the button end portion 1000 is flush with the surrounding surface of recess 960, etc. However, the button end portion may be pressed inwardly to raise the end surface 1001 of the plunger shaft a small distance, e.g., ¼ inch to disengage an associated tab, e.g. 828 of an associated side panel member to act as a side member trip mechanism, as described in further detail below.

As illustrated in FIG. 35–38 each of the recesses 964, 966, 972, 974 has a generally rectangularly shaped hole 1020 provided therein. The hole is extended upwardly by an annular wall 1022 having an upper edge surface 1023, which is adapted to support the sheet metal housing thereon. A U-shaped flex member 1024 is associated with each hole and annular wall 1022. The flex member includes a free end leg 1026 and a fixed end leg 1028. The fixed end leg 1028 may be integral with the annular wall 1022. The free end leg has a step/barb portion at the end thereof, which includes a bevel upper surface 1021 and a horizontal abutment surface 1032. The lower tip of free end leg 1026 projects downwardly sufficiently such that it may be gripped with a person's finger and move inwardly from its normal outwardly bias position shown in FIG. 35 and FIG. 38. Also, projecting upwardly from the upper surface of the base member in the end portions 950 and 952 thereof are locator tabs 1034, 1036 having edge surfaces which are adapted to longitudinally and laterally align the sheet metal housing 12 when it is positioned on the base member 282.

The housing 12 is mounted on the case member 282 as follows. The housing is placed bottom end first on the base member so that the upstanding portions of U-shaped flex members 1024 are received through square holes 231, 233, 235, 237 in the base, FIG. 5. As the housing is urged downwardly the flex members 1024 free legs 1026 initially flex inwardly as the edges of holes 231, 233, 235, 237 engage the beveled surface 1030. After the sheet metal bottom surface has move into contact with the top edge surface 1023 of upstanding walls 1022 the upper surface of the housing bottom wall has passed the lower surface 1032 of the free leg end portion 1030 allowing it to spring back to its bias position capturing the base bottom sheet metal wall between surface 1032 and surface 1023 of the base member. Thus, a snap lock arrangement is provided for mounting the base member 282 on the sheet metal housing 12. To release the base member from this locked relationship with the U-shaped flex member 1024 the free leg 1026 is engaged with a person's finger and moved outwardly. This outward movement causes the surface 1032 to be moved sufficiently to release the locking engagement. Thus the U-shaped flex members act as bottom (base) member trip mechanisms.

The integral top/front member 890 and rear compound member are mounted on the housing by pressing the projections thereon into corresponding openings in the housing. This may be done before or after mounting housing 12 on base 282.

Figure 39:
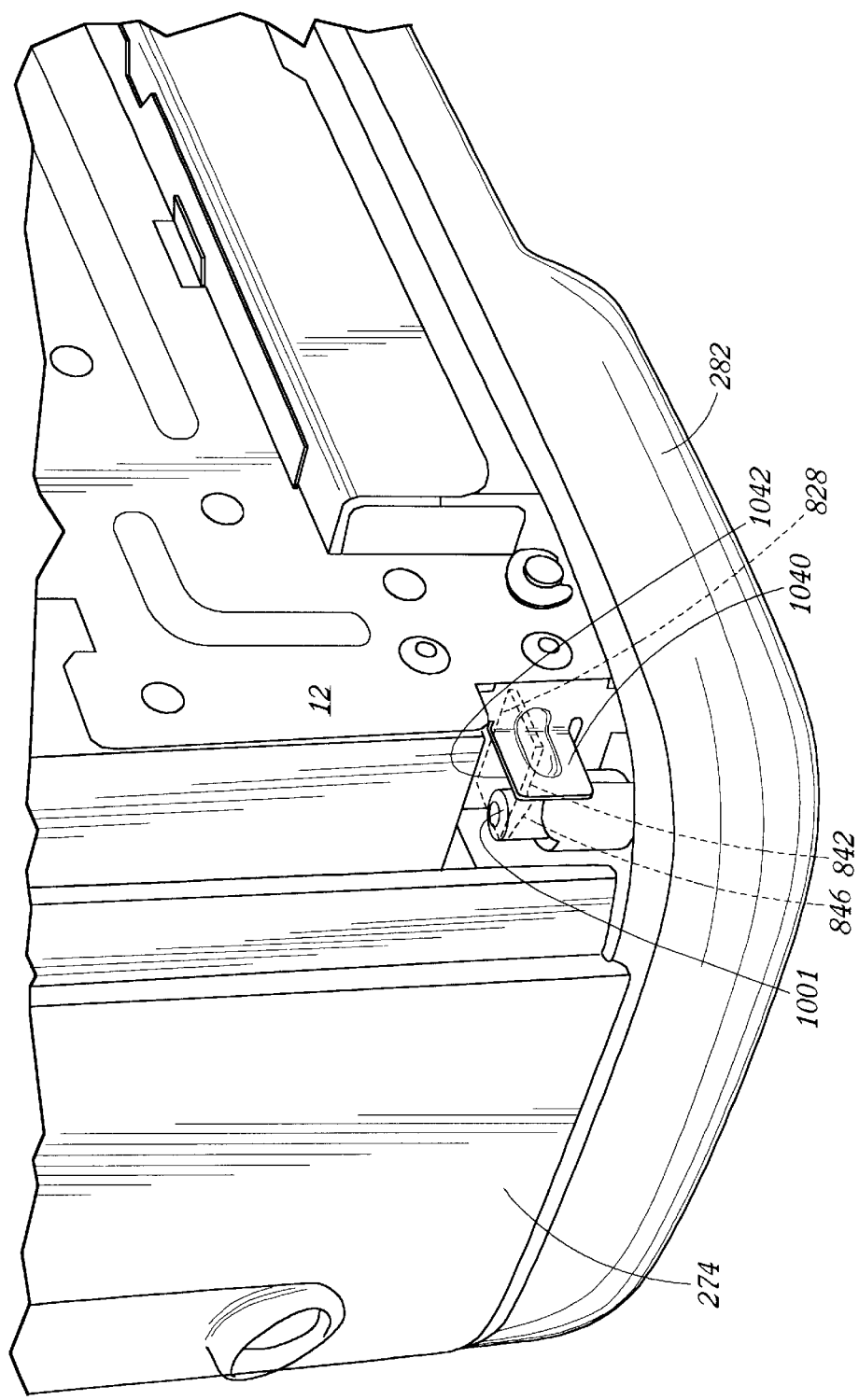
FIG. 39 is a perspective view of a bottom front right corner portion of the computer of FIG. 24 with a right panel portion removed.

The mounting of the side panels 278, 284 is the final step in assembling the plastic casing 270, i.e., this assembly takes place after the top/front, rear and base portions 890, 278, 282 of the casing 270 have been mounted on the housing 12. Initially a front panel, e.g., right panel 284 is positioned at approximately the position that it will occupy when mounted except that the bottom portion of the panel is held away from the base 282, a small distance, e.g., 10 mm, to facilitate positioning the panel upper projections 814, 816 inside the cutouts 920 in member 890. Once the projections are received in the cut outs, the panel is pivoted about its top edge, i.e., the bottom of the panel is moved inwardly, until the bottom tabs 828 are heard to snap into locking engagement with the corresponding sheet metal housing projections 1040. The pivotable movement of the panel 284 causes the projections 818, 820, 822, 824 to move below the lateral edge 906 of the integral member 890. Once this pivotable movement takes place the top portion of the panel 284 is prevented from moving laterally relative the integral member 890 by the engagement of projections 814, 816 with the cutouts and is prevented from moving upwardly by the engagement of lower projections 818, 820, with the lower surface of the integral member lateral edge portion 906. Thus, the only way for removing the top portion of the panel 284 from its engaged relationship with integral member 890 is by reversing the pivotal movement by which it was seated. Similarly, the projections 831 along the lateral sides of the panel member 284 are received in cutouts 912 in the lateral edge portion member 890 in a manner which prevents there removal except by pivotal movement in the reverse direction of that when the panel member was initially seated. The downward slope of the cutouts 912 prevent the corresponding projections 831 from being displaced in a straight out lateral direction. The manner by which the panel member lower tab 828 is caused to snap into locking engagement with housing projection 1040 is best illustrated in FIG. 39. As the bottom tab 828 moves inwardly its upwardly and outwardly sloping beveled surface 846 initially engages the top edge 1042 of housing projection 1040 causing the end of the tab to rise up as it moves inwardly across edge surface 1042. At the same position that the recessed bottom edge surface of the panel member comes into abutting engagement with the top recessed surface portion of the base 282 the tab vertically extending surface 844 clears edge surface 1042. At this point the resilient tab springs downwardly until the bottom horizontal surface 842 thereof engages the top edge 1042 of projection 1040. The vertically extending surface 844 of the tab is positioned in abutting engagement with the inner-vertical surface of housing projection 1040, preventing the tab 828 and attached lower portion of the panel 284 from being displaced outwardly. Thus, by the locking action of the bottom tabs 828, 830 the bottom portion of the housing is prevented from the being laterally displaced and thus the pivotal displacement needed to disengage the lateral or top edges of the panel from their seated positions is prevented. Accordingly, the panel is locked into immobile relationship with the rest of the plastic casing 270 until the tabs 826, 828 are displaced by an outside deflection force.

Figure 40:
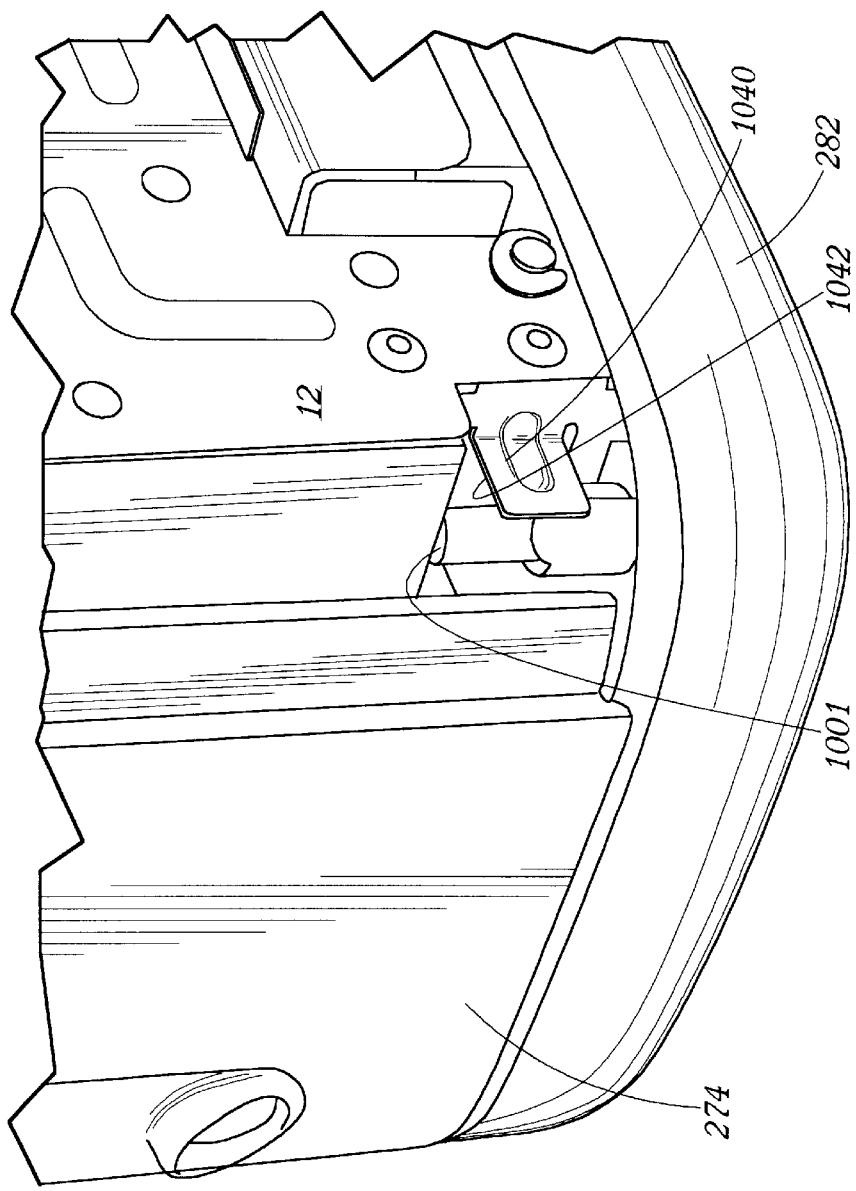
FIG. 40 is the same perspective view as FIG. 39 except showing a plunger member in a raised position.

The manner by which the panel members 278, 284 may be removed from their locked relationship with the remainder of the casing 270 will now be described. Initially, the bottom surface 948 is exposed to an operator as by placing the computer on its side. Next the two plunger member 994 associated with the side panel to be removed, e.g., the two members 994 on the right side of the computer if the right side panel is to be removed, are both pushed. This pushing movement causes the plunger members to move upwardly relative to the base end and causes the end portion 1001 thereof to engage the bottom beveled surface 846 of the side panel bottom tab 828 raising it upwardly sufficiently for the vertical surface tab to clear edge 1040 of the housing projection. Thereafter, the operator may pull the bottom edge of the panel edge outwardly to produce the pivotal defection needed to cause disengagement of the top and lateral edge portions of the panel with the corresponding portions of the integral member 890. Thereafter, the panel member may be removed. This upper position of the plunger member top end 1001 is shown in FIG. 40. Thus, an outer casing 270 is provided which may be mounted on housing 12 through locking engagement of casing portions with the housing and other casing portions to form an enclosure with no visible means of unlocking the casing when the computer is its normal operating position. Such an arrangement is desirable to prevent inadvertent removal of panels as by mischievous co-workers or by customers at a retail outlet at which the computer is displayed. However, by simply turning the computer on its side a person knowledgeable as to the operation of the casing may quickly remove the side panels thereof to access the interior of the computer or for the purpose of replacing the side panels with side panels of different colors or different surface ornamentation as maybe desired. Also, the quickly removable base enables rapid access to the modular hard drive mounted in the bottom of the housing 12. Both operations, side panel removable and base removal, may each be accomplished in 5 or 10 seconds by an operator who has read the owner's manual. The rear and integral top/front portions of the casing may also be easily removed when required by opening the housing right side panel to provide access to the mother board chamber and thereafter hand deflecting the snap lock tabs from engagement with the interior portions of the sheet metal housing and then removing the members.

C.G. Locations

The mass, height, center of gravity (c.g.) and the relative vertical position of various components of the computer will now be described for components of the illustrated embodiment with particular reference to FIG. 25.

The outer right panel 284 has a mass of 268 g and a height of 321 mm from top edge 812 to bottom edge 810. The panel has a center of gravity positioned 157 mm above the bottom edge 810 and the bottom edge is positioned about 24 mm above a base surface 271 upon which the computer 10 rests. The left panel 278 has the same mass, height, center of gravity and relative position as the right panel 284.

The plastic base member 282 has a mass of 156 g and has a height of 28 mm measured from a bottom portion of lower feet 958 to the top edge 982 of the base member. The base has a center of gravity positioned about 13 mm above the bottom of the base feet 958 (or surface 271).

Integrated top and front casing piece 890 has a mass of 128 g and has a height measured from a bottom edge 898 to the top surface 899 thereof of 321 mm. This member has a center of gravity about 250 mm from the bottom edge 898. This integral piece, like the left and right panels, has its bottom edge positioned 24 mm above the bottom most foot surface of the base member.

The rear compound member 276 has a mass of 134 g and a height of 295 mm. The center of gravity of the rear member is about 140 mm from its bottom edge 863 and its bottom edge is located 25 mm above the bottom of the base member feet.

The optical drive 410 has a mass of 479 g including the mass of its removable mounting bracket 432 and has a height measured from the bottom face 424 of the drive to the top edge of its mounting bracket of 140 mm. The center of gravity of the optical drive is located on axis aa 65 mm above its bottom face. The bottom face is positioned 110 mm above the bottom of the sheet metal housing 12 and 128 mm above the bottom of the base member 282.

The power supply assembly 510 has a mass of 873 g and has a height of 57 mm. The center of gravity the power supply is on axis bb about 26 mm above its bottom face 536. Bottom face 536 is located 32 mm above the bottom of the sheet metal housing 12 and 50 mm above the bottom of the plastic base 282. The power supply assembly center of gravity is thus located about 76 mm above the bottom of base 282. This center of gravity (c.g.) is below the quarter height of the computer which is 88 mm above the base bottom and located on axis gg.

The hard drive 710 has a mass of 497 g and a height of 21 mm. The center of gravity of the hard drive is positioned on axis cc about 13 mm above its bottom face 714 and its bottom face is located 2 mm above the bottom of the sheet metal housing 12 and about 20 mm above the bottom of the plastic base 282.

The sheet metal housing 12 and internal components, with the optical drive 410 and attached drive bracket 432, the power supply assembly 510, the hard drive 710, and the outer plastic casing 270 all removed, has a mass of 2,694 g. The height of the sheet metal housing is 306 mm with the center of gravity positioned on axis dd about 150 mm above the bottom surface of the sheet metal housing and 168 mm above the bottom of the plastic base 282. The sheet metal housing is positioned about 18 mm above the bottom of the plastic base 282.

The assembled computer has a mass of 5,363 g, a height of 350 mm, and a center of gravity on axis ff about 147 mm above the bottom most surface of base 282. The center of gravity of the computer ff is thus about 28 mm below the computer mid-height ee. The assembled computer has a leaning balance point angle left or right of approximately 20 degrees. The distance between the outer most portions of the feet 958 is 87 mm and the maximum width of the base is about 119 mm.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A computer assembly comprising:
   a computer housing; and
   a plurality of separate outer casing members mountable in enveloping relationship with said housing;
   said plurality of outer casing members having an attached state in fixedly mounted relationship with said housing and a disengaged state in non-touching relationship with said housing;
   said plurality of outer casing members being toolessly switchable between said attached state and said disengaged state;
   each of said casing members being interlockingly engageable with a least another one of said casing members;
   said plurality of outer casing members being toolessly switchable between said attached state and said disengaged state by actuation of at least one trip mechanism mounted on a bottom one of said casing members.

2. A computer assembly comprising:
   a computer housing; and
   a plurality of separate outer casing members mountable in enveloping relationship with said housing;
   said plurality of outer casing members having an attached state in fixedly mounted relationship with said housing and a disengaged state in non-touching relationship with said housing;
   said plurality of outer casing members being toolessly switchable between said attached state and said disengaged state;
   said plurality of members comprising a top member, a bottom member and at least one side member;
   said side member comprising a top portion and a bottom portion and further comprising a first tab portion located at said top portion thereof and a second tab portion mounted at a bottom portion thereof;
   said top member comprising a first tab receiving portion for receiving said first tab portion in pivotally hookingly engageable and disengageable relationship therewith;
   said housing comprising a second tab receiving portion at a lower end thereof for snappingly holdingly engaging said second tab portion;
   a second tab releasing assembly being mounted in said bottom member for selectively releasing said second tab portion from holding engagement from said second tab receiving portion wherein said second tab releasing assembly comprises at least one displaceable member urgable against at least one of said second tab receiving portion and said second tab portion.

3. The computer assembly of claim 2 wherein said second tab releasing assembly comprises a bias member operatively associated with said at least one displaceable member.

4. The computer assembly of claim 3, at least one displaceable member having a top end and a bottom end and having a push button portion at said bottom end, said bias member biasing said at least one displaceable member downwardly in a normal operating position of said computer.

5. A computer assembly comprising:
   a computer housing; and
   a plurality of separate outer casing members mountable in enveloping relationship with said housing;
   said plurality of outer casing members having an attached state in fixedly mounted relationship with said housing and a disengaged state in non-touching relationship with said housing;
   said plurality of outer casing members being toolessly switchable between said attached state and said disengaged state;
   each of said casing members being interlockingly engageable with a least another one of said casing members;
   said casing members comprising at least a first side member and a bottom member and further comprising a side member trip mechanism mounted in said bottom member;
   said bottom member being engaged with said housing, and further comprising at least one bottom member trip mechanism mounted in said bottom member and adapted to release said bottom member from engagement with said housing.

6. The computer assembly of claim 5, said bottom member trip mechanism being hidden from view when said computer assembly is in a normal operating position on a work surface.

7. The computer assembly of claim 5, said bottom member trip mechanism comprising a U-shaped member.

* * * * *